US007921459B2

(12) United States Patent
Houston et al.

(10) Patent No.: US 7,921,459 B2
(45) Date of Patent: Apr. 5, 2011

(54) SYSTEM AND METHOD FOR MANAGING SECURITY EVENTS ON A NETWORK

(75) Inventors: Gregory Neil Houston, Norcross, GA (US); Christian D. Kobsa, Lawrenceville, GA (US); Sridhar Embar, Atlanta, GA (US); Matthew Thaddeus Di Iorio, Atlanta, GA (US); Bryan Douglas Williams, Lawrenceville, GA (US); Michael George Nikitaides, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 1206 days.

(21) Appl. No.: 09/844,448

(22) Filed: Apr. 27, 2001
(Under 37 CFR 1.47)

(65) Prior Publication Data
US 2002/0019945 A1 Feb. 14, 2002

Related U.S. Application Data

(60) Provisional application No. 60/200,313, filed on Apr. 28, 2000.

(51) Int. Cl.
*G06F 11/32* (2006.01)
(52) U.S. Cl. .............. 726/22; 726/23; 726/25; 709/223; 709/225
(58) Field of Classification Search .................. 713/201, 713/152; 709/224; 726/22, 26
See application file for complete search history.

(56) References Cited

U.S. PATENT DOCUMENTS

| 4,223,380 | A | | 9/1980 | Antonaccio et al. |
| 4,400,769 | A | | 8/1983 | Kaneda et al. |
| 4,672,609 | A | | 6/1987 | Humphrey et al. |
| 4,773,028 | A | | 9/1988 | Tallman |
| 4,819,234 | A | | 4/1989 | Huber |
| 4,975,950 | A | | 12/1990 | Lentz |
| 5,032,979 | A | | 7/1991 | Hecht et al. |
| 5,063,523 | A | * | 11/1991 | Vrenjak ........................ 709/223 |
| 5,121,345 | A | | 6/1992 | Lentz |
| 5,204,966 | A | | 4/1993 | Wittenberg et al. |

(Continued)

FOREIGN PATENT DOCUMENTS

EP  0 636 977  5/2001

(Continued)

OTHER PUBLICATIONS

Essex, David; *E-Sleuths Make Net Safe for E-Commerce*; Computerworld; Jun. 2000; pp. 1-2.

(Continued)

*Primary Examiner* — Ponnoreay Pich
(74) *Attorney, Agent, or Firm* — King & Spalding LLP

(57) ABSTRACT

A computer-implemented system for managing security event data collected from a computing network. The system employs an event managing software module that can reside on a computing network that is being monitored with security devices. The event managing software collects security event data from security devices located in the monitored computing network and can process the security event data. In processing the security event data, the event manager module can format the data and create manageable summaries of the data. The event manager also supports storage of the security event data and the results of any processing performed on the data. Security event data can be identified by the event manager for use in responding to a security event.

25 Claims, 22 Drawing Sheets

U.S. PATENT DOCUMENTS

| | | | |
|---|---|---|---|
| 5,210,704 A | 5/1993 | Husseiny | |
| 5,274,824 A | 12/1993 | Howarth | |
| 5,278,901 A | 1/1994 | Shieh et al. | |
| 5,309,562 A | 5/1994 | Li | |
| 5,311,593 A | 5/1994 | Carmi | |
| 5,345,595 A | 9/1994 | Johnson et al. | |
| 5,347,450 A | 9/1994 | Nugent | |
| 5,353,393 A | 10/1994 | Bennett et al. | |
| 5,359,659 A | 10/1994 | Rosenthal | |
| 5,371,852 A | 12/1994 | Attanasio et al. | |
| 5,375,199 A * | 12/1994 | Harrow et al. | 715/771 |
| 5,398,196 A | 3/1995 | Chambers | |
| 5,414,833 A | 5/1995 | Hershey et al. | |
| 5,440,723 A | 8/1995 | Arnold et al. | |
| 5,452,442 A | 9/1995 | Kephart | |
| 5,454,074 A | 9/1995 | Hartel et al. | |
| 5,475,839 A | 12/1995 | Watson et al. | |
| 5,511,184 A | 4/1996 | Lin | |
| 5,515,508 A | 5/1996 | Pettus et al. | |
| 5,522,026 A | 5/1996 | Records et al. | |
| 5,539,659 A | 7/1996 | McKee et al. | |
| 5,557,742 A | 9/1996 | Smaha et al. | |
| 5,586,260 A | 12/1996 | Hu | |
| 5,590,331 A | 12/1996 | Lewis et al. | |
| 5,606,668 A | 2/1997 | Shwed | |
| 5,623,600 A | 4/1997 | Ji et al. | |
| 5,623,601 A | 4/1997 | Vu | |
| 5,630,061 A | 5/1997 | Richter et al. | |
| 5,649,095 A | 7/1997 | Cozza | |
| 5,649,185 A | 7/1997 | Antognini et al. | |
| 5,675,711 A | 10/1997 | Kephart et al. | |
| 5,696,486 A | 12/1997 | Poliquin et al. | |
| 5,696,822 A | 12/1997 | Nachenberg | |
| 5,706,210 A | 1/1998 | Kumano et al. | |
| 5,715,395 A | 2/1998 | Brabson et al. | |
| 5,721,825 A * | 2/1998 | Lawson et al. | 709/203 |
| 5,734,697 A | 3/1998 | Jabbarnezhad | |
| 5,745,692 A | 4/1998 | Lohmann, II et al. | |
| 5,748,098 A | 5/1998 | Grace | |
| 5,761,504 A | 6/1998 | Corrigan et al. | |
| 5,764,887 A | 6/1998 | Kells et al. | |
| 5,764,890 A | 6/1998 | Glasser et al. | |
| 5,765,030 A | 6/1998 | Nachenberg et al. | |
| 5,774,667 A * | 6/1998 | Garvey et al. | 709/222 |
| 5,774,727 A | 6/1998 | Walsh et al. | |
| 5,787,177 A | 7/1998 | Leppek | |
| 5,790,799 A | 8/1998 | Mogul | |
| 5,796,942 A | 8/1998 | Esbensen | |
| 5,798,706 A | 8/1998 | Kraemer et al. | |
| 5,812,763 A | 9/1998 | Teng | |
| 5,815,574 A | 9/1998 | Fortinsky | |
| 5,822,517 A | 10/1998 | Dotan | |
| 5,826,013 A | 10/1998 | Nachenberg | |
| 5,828,833 A | 10/1998 | Belville et al. | |
| 5,832,208 A | 11/1998 | Chen et al. | |
| 5,832,211 A | 11/1998 | Blakley, III et al. | |
| 5,832,503 A * | 11/1998 | Malik et al. | 709/223 |
| 5,835,726 A | 11/1998 | Shwed et al. | |
| 5,838,903 A | 11/1998 | Blakely, III et al. | |
| 5,842,002 A | 11/1998 | Schnurer et al. | |
| 5,845,067 A | 12/1998 | Porter et al. | |
| 5,848,233 A | 12/1998 | Radia et al. | |
| 5,854,916 A | 12/1998 | Nachenberg | |
| 5,857,191 A | 1/1999 | Blackwell, Jr. et al. | |
| 5,864,665 A | 1/1999 | Tran | |
| 5,864,803 A | 1/1999 | Nussbaum | |
| 5,872,915 A | 2/1999 | Dykes et al. | |
| 5,872,978 A | 2/1999 | Hoskins | |
| 5,875,296 A | 2/1999 | Shi et al. | |
| 5,878,420 A | 3/1999 | de la Salle | |
| 5,881,236 A | 3/1999 | Dickey | |
| 5,884,033 A | 3/1999 | Duvall et al. | |
| 5,892,903 A | 4/1999 | Klaus | |
| 5,899,999 A | 5/1999 | De Bonet | |
| 5,905,859 A * | 5/1999 | Holloway et al. | 713/201 |
| 5,907,834 A | 5/1999 | Kephart et al. | |
| 5,919,257 A | 7/1999 | Trostle | |
| 5,919,258 A | 7/1999 | Kayashima et al. | |
| 5,922,051 A | 7/1999 | Sidey | |
| 5,925,126 A | 7/1999 | Hsieh | |
| 5,930,476 A * | 7/1999 | Yamunachari et al. | 709/224 |
| 5,931,946 A | 8/1999 | Terada et al. | |
| 5,940,591 A | 8/1999 | Boyle et al. | |
| 5,950,012 A | 9/1999 | Shiell et al. | |
| 5,961,644 A | 10/1999 | Kurtzberg et al. | |
| 5,964,839 A | 10/1999 | Johnson et al. | |
| 5,964,889 A | 10/1999 | Nachenberg | |
| 5,974,237 A | 10/1999 | Shurmer et al. | |
| 5,974,457 A | 10/1999 | Waclawsky et al. | |
| 5,978,917 A | 11/1999 | Chi | |
| 5,983,270 A | 11/1999 | Abraham et al. | |
| 5,983,348 A | 11/1999 | Ji | |
| 5,983,350 A | 11/1999 | Minear et al. | |
| 5,987,606 A | 11/1999 | Cirasole et al. | |
| 5,987,610 A | 11/1999 | Franczek et al. | |
| 5,987,611 A | 11/1999 | Freund | |
| 5,991,856 A | 11/1999 | Spilo et al. | |
| 5,991,881 A * | 11/1999 | Conklin et al. | 726/22 |
| 5,999,711 A | 12/1999 | Misra et al. | |
| 5,999,723 A | 12/1999 | Nachenberg | |
| 6,003,132 A | 12/1999 | Mann | |
| 6,006,016 A | 12/1999 | Faigon et al. | |
| 6,009,467 A | 12/1999 | Ratcliff et al. | |
| 6,014,645 A | 1/2000 | Cunningham | |
| 6,016,553 A | 1/2000 | Schneider et al. | |
| 6,021,510 A | 2/2000 | Nachenberg | |
| 6,026,442 A | 2/2000 | Lewis et al. | |
| 6,029,256 A | 2/2000 | Kouznetsov | |
| 6,035,323 A | 3/2000 | Narayen et al. | |
| 6,035,423 A | 3/2000 | Hodges et al. | |
| 6,041,347 A | 3/2000 | Harsham et al. | |
| 6,052,709 A | 4/2000 | Paul | |
| 6,061,795 A | 5/2000 | Dircks et al. | |
| 6,067,410 A | 5/2000 | Nachenberg | |
| 6,070,190 A | 5/2000 | Reps et al. | |
| 6,070,244 A | 5/2000 | Orchier et al. | |
| 6,073,172 A | 6/2000 | Frailong et al. | |
| 6,081,894 A | 6/2000 | Mann | |
| 6,085,224 A | 7/2000 | Wagner | |
| 6,088,803 A | 7/2000 | Tso et al. | |
| 6,088,804 A | 7/2000 | Hill et al. | |
| 6,092,194 A | 7/2000 | Touboul | |
| 6,094,731 A | 7/2000 | Waldin et al. | |
| 6,098,173 A | 8/2000 | Elgressy et al. | |
| 6,104,783 A | 8/2000 | DeFino | |
| 6,108,799 A | 8/2000 | Boulay et al. | |
| 6,118,940 A | 9/2000 | Alexander, III et al. | |
| 6,119,165 A | 9/2000 | Li et al. | |
| 6,119,234 A | 9/2000 | Aziz et al. | |
| 6,122,738 A | 9/2000 | Millard | |
| 6,144,961 A | 11/2000 | de la Salle | |
| 6,154,844 A | 11/2000 | Touboul et al. | |
| 6,161,109 A | 12/2000 | Matamoros et al. | |
| 6,167,520 A | 12/2000 | Touboul | |
| 6,173,413 B1 | 1/2001 | Slaughter et al. | |
| 6,185,689 B1 | 2/2001 | Todd, Sr. et al. | |
| 6,195,687 B1 | 2/2001 | Greaves et al. | |
| 6,199,181 B1 | 3/2001 | Rechef et al. | |
| 6,205,552 B1 | 3/2001 | Fudge | |
| 6,220,768 B1 | 4/2001 | Barroux | |
| 6,226,372 B1 | 5/2001 | Beebe et al. | |
| 6,230,288 B1 | 5/2001 | Kuo et al. | |
| 6,266,773 B1 | 7/2001 | Kisor et al. | |
| 6,266,774 B1 | 7/2001 | Sampath et al. | |
| 6,271,840 B1 | 8/2001 | Finseth et al. | |
| 6,272,641 B1 | 8/2001 | Ji | |
| 6,275,938 B1 | 8/2001 | Bond et al. | |
| 6,275,942 B1 | 8/2001 | Bernhard et al. | |
| 6,278,886 B1 | 8/2001 | Hwang | |
| 6,279,113 B1 | 8/2001 | Vaidya | |
| 6,282,546 B1 | 8/2001 | Gleichauf et al. | |
| 6,298,445 B1 | 10/2001 | Shostack et al. | |
| 6,301,668 B1 | 10/2001 | Gleichauf et al. | |
| 6,314,520 B1 | 11/2001 | Schell et al. | |
| 6,314,525 B1 | 11/2001 | Mahalingham et al. | |
| 6,321,338 B1 | 11/2001 | Porras et al. | |
| 6,324,627 B1 | 11/2001 | Kricheff et al. | |

| | | |
|---|---|---|
| 6,324,647 B1 | 11/2001 | Bowman-Amuah |
| 6,324,656 B1 | 11/2001 | Gleichauf et al. |
| 6,338,141 B1 | 1/2002 | Wells |
| 6,347,374 B1 * | 2/2002 | Drake et al. .................. 713/200 |
| 6,353,385 B1 | 3/2002 | Molini et al. |
| 6,357,008 B1 | 3/2002 | Nachenberg |
| 6,377,994 B1 | 4/2002 | Ault et al. |
| 6,396,845 B1 | 5/2002 | Sugita |
| 6,397,242 B1 | 5/2002 | Devine et al. |
| 6,397,245 B1 | 5/2002 | Johnson, II et al. |
| 6,405,318 B1 | 6/2002 | Rowland |
| 6,405,364 B1 | 6/2002 | Bowman-Amuah |
| 6,408,391 B1 | 6/2002 | Huff et al. |
| 6,415,321 B1 | 7/2002 | Gleichauf et al. |
| 6,429,952 B1 | 8/2002 | Olbricht |
| 6,434,615 B1 | 8/2002 | Dinh et al. |
| 6,438,600 B1 | 8/2002 | Greenfield et al. |
| 6,445,822 B1 | 9/2002 | Crill et al. |
| 6,453,345 B2 * | 9/2002 | Trcka et al. .................. 709/224 |
| 6,453,346 B1 | 9/2002 | Garg et al. |
| 6,460,141 B1 | 10/2002 | Olden |
| 6,463,426 B1 | 10/2002 | Lipson et al. |
| 6,467,002 B1 | 10/2002 | Yang |
| 6,470,449 B1 | 10/2002 | Blandford |
| 6,477,585 B1 | 11/2002 | Cohen et al. |
| 6,477,648 B1 | 11/2002 | Schell et al. |
| 6,477,651 B1 | 11/2002 | Teal |
| 6,484,203 B1 | 11/2002 | Porras et al. |
| 6,487,666 B1 | 11/2002 | Shanklin et al. |
| 6,493,752 B1 * | 12/2002 | Lee et al. ...................... 713/201 |
| 6,496,858 B1 | 12/2002 | Frailong et al. |
| 6,499,107 B1 | 12/2002 | Gleichauf et al. |
| 6,510,523 B1 | 1/2003 | Perlman et al. |
| 6,517,587 B2 | 2/2003 | Satyavolu et al. |
| 6,519,647 B1 | 2/2003 | Howard et al. |
| 6,519,703 B1 | 2/2003 | Joyce |
| 6,530,024 B1 | 3/2003 | Proctor |
| 6,535,227 B1 | 3/2003 | Fox et al. |
| 6,546,493 B1 | 4/2003 | Magdych et al. |
| 6,563,959 B1 | 5/2003 | Troyanker |
| 6,574,737 B1 | 6/2003 | Kingsford et al. |
| 6,578,147 B1 | 6/2003 | Shanklin et al. |
| 6,584,454 B1 | 6/2003 | Hummel, Jr. et al. |
| 6,601,190 B1 | 7/2003 | Meyer et al. |
| 6,606,744 B1 | 8/2003 | Mikurak |
| 6,618,501 B1 | 9/2003 | Osawa et al. |
| 6,628,824 B1 | 9/2003 | Belanger |
| 6,647,139 B1 | 11/2003 | Kunii et al. |
| 6,647,400 B1 | 11/2003 | Moran |
| 6,661,904 B1 | 12/2003 | Sasich et al. |
| 6,668,082 B1 | 12/2003 | Davison et al. |
| 6,668,084 B1 | 12/2003 | Minami |
| 6,681,331 B1 | 1/2004 | Munson et al. |
| 6,691,232 B1 | 2/2004 | Wood et al. |
| 6,704,874 B1 | 3/2004 | Porras et al. |
| 6,708,212 B2 | 3/2004 | Porras et al. |
| 6,711,127 B1 | 3/2004 | Gorman et al. |
| 6,711,615 B2 | 3/2004 | Porras et al. |
| 6,718,383 B1 | 4/2004 | Hebert |
| 6,721,806 B2 | 4/2004 | Boyd et al. |
| 6,725,377 B1 | 4/2004 | Kouznetsov |
| 6,725,378 B1 * | 4/2004 | Schuba et al. .................. 726/13 |
| 6,775,657 B1 * | 8/2004 | Baker .............................. 706/45 |
| 6,775,780 B1 | 8/2004 | Muttik |
| 6,792,144 B1 | 9/2004 | Yan et al. |
| 6,792,546 B1 | 9/2004 | Shanklin et al. |
| 6,816,973 B1 | 11/2004 | Gleichauf et al. |
| 6,839,850 B1 | 1/2005 | Campbell et al. |
| 6,851,057 B1 | 2/2005 | Nachenberg |
| 6,871,284 B2 | 3/2005 | Cooper et al. |
| 6,886,102 B1 | 4/2005 | Lyle |
| 6,889,168 B2 | 5/2005 | Hartley et al. |
| 6,912,676 B1 | 6/2005 | Gusler et al. |
| 2001/0034847 A1 | 10/2001 | Gaul, Jr. |
| 2002/0032717 A1 | 3/2002 | Malan et al. |
| 2002/0032793 A1 | 3/2002 | Malan et al. |
| 2002/0032880 A1 | 3/2002 | Poletto et al. |
| 2002/0035698 A1 | 3/2002 | Malan et al. |
| 2002/0083331 A1 | 6/2002 | Krumel |
| 2002/0083334 A1 | 6/2002 | Rogers et al. |
| 2002/0138753 A1 | 9/2002 | Munson |
| 2002/0144156 A1 | 10/2002 | Copeland, III |
| 2003/0037136 A1 | 2/2003 | Labovitz et al. |
| 2003/0088791 A1 | 5/2003 | Porras et al. |
| 2003/0212903 A1 | 11/2003 | Porras et al. |
| 2004/0010718 A1 | 1/2004 | Porras et al. |

FOREIGN PATENT DOCUMENTS

| | | |
|---|---|---|
| EP | 0 985 995 | 8/2003 |
| WO | WO 93/25024 | 12/1993 |
| WO | WO 98/41919 | 9/1998 |
| WO | WO 99/00720 | 1/1999 |
| WO | WO 99/13427 | 3/1999 |
| WO | WO 99/15966 | 4/1999 |
| WO | WO 99/50734 | 10/1999 |
| WO | WO 99/53391 | 10/1999 |
| WO | WO 99/57626 | 11/1999 |
| WO | WO 00/02115 | 1/2000 |
| WO | WO 00/10278 | 2/2000 |
| WO | WO 00/25214 | 5/2000 |
| WO | WO 00/25527 | 5/2000 |
| WO | WO 00/34867 | 6/2000 |
| WO | WO 00/54458 | 9/2000 |
| WO | WO 01/84285 | 11/2001 |
| WO | WO 02/06928 | 1/2002 |
| WO | WO 02/056152 | 7/2002 |
| WO | WO 02/101516 | 12/2002 |

OTHER PUBLICATIONS

Newman, David; *Intrusion Detection Systems*; Data Communications; 1998; pp. 1-9.

International Search Report for PCT/US 02/17161 dated Dec. 31, 2002.

Hyland, et al., Concentric Supervision of Security Applications: A New Security Management Paradigm Computer Security Applications Conference, 1998, pp. 59-68, (1998).

Koilpillai, et al., Recon—A Tool for Incident Detection, Tracking and Response, Darpa Information Survivability Conference and Exposition, 2000, pp. 199-206, (2000).

Alves-Foss, J., An overview of SNIF: a tool for Surveying Network Information Flow, Network and Distributed System Security, 1995, pp. 94-101 (1995).

Mansouri-Samani, et al., A Configurable Event Service for Distributed Systems, Configurable Distributed Systems, 1996, pp. 210-217, (1996).

International Search Report for PCT/US 01/13769, Mar. 8, 2002.

Essex, David, E-Sleuths Make Net Safe for E-Commerce, Computerworld, Jun. 2000, pp. 1-2.

Newman, David, Intrusion Detection Systems, Data Communications, 1998, pp. 1-9.

International Search Report for PCT/US02/17161 of Dec. 31, 2002.

Hyland, et al., Concentric Supervision of Security Applications: A New Security Management Paradigm Computer Security Applications Conference, 1998, pp. 59-68.

Koilpillai et al., Recon—A Tool for Incident Detection, Tracking and Response, Darpa Information Survivability Conference and Exposition, 2000, pp. 199-206.

Alves-Foss, J., An Overview of SNIF: A Tool for Surveying Network Information Flow, Network and Distributed System Security, 1995, pp. 94-101.

Mansouri-Samani et al., A Configurable Event Service for Distributed Systems Configurable Distributed Systems, 1996, pp. 210-217.

International Search Report for PCT/US01/13769 of Mar. 8, 2002.

Jagannathan et al., System Design Document: Next-Generation Intrusion Detection Expert Systems (NIDES), Internet Citation, Mar. 9, 1993, XP002136082, pp. 1-66.

Koilpillai, Adaptive Network Security Management, DARPA NGI PI Conference, Oct. 1998, pp. 1-27.

Hiverworld Continuous Adaptive Risk Management, Hiverworld, Inc., 1999-2000, pp. 1-14.

International Search Report for PCT/US02/04989of Sep. 19, 2002.

International Search Report for PCT/US02/02917 of Aug. 8, 2002.

International Search Report for PCT/US03/00155 of May 15, 2003.

NXI Communications, Inc., White Paper, NTS Security Issues, Oct. 15, 2001, pp. 1-12.
Mounji et al., Distributed Audit Trail Analysis, Proceedings of the Symposium of Network and Distributed System Security, San Diego, CA, Feb. 16-17, 1995, pp. 102-112.
Wobber et al., Authentication in the Taos Operating System, ACM Transactions on Computer Systems, vol. 12, No. 1, Feb. 1994, pp. 3-32.
Mayer et al., The Design of the Trusted Workstation: A True Infosec Product, 13$^{th}$ National Computer Security Conference, Washing, DC, Oct. 1-4, 1990, pp. 827-839.
Dawson, Intrusion Protection for Networks, Byte, Apr. 1995, pp. 171-172.
Buhkan, Checkpoint Charlie, PC Week Network, Nov. 27, 1995, pp. N1, N6-N7.
Process Software Technical Support Page, found on http://www.process.com/techsupport/whitesec.html, printed off of the Process Software website on Feb. 26, 2003, pp. 1-5.
Ganesan, BAfirewall: A Modern Firewall Design, Proceedings Internet Society Symposium on Network and Distributed System Security 1994, Internet Soc., 1994, pp. 99-108.
Lee, Trusted Systems, Chapter II-1-6 of Handbook of Information Security Management, Ed. Zella G. Ruthberg and Harold F. Tipton, Auerbach, Boston and New York, 1993, pp. 345-362.
Lunt, Automated Intrusion Detection, Chapter II-4-4 of Handbook of Information Security Management, Ed. Zella G. Ruthberg and Harold F. Tipton, Auerbach, Boston and New York, 1993, pp. 551-563.
Guha et al., Network Security via Reverse Engineering of TCP Code: Vulnerability Analysis and Proposed Solution, IEEE, Mar. 1996, pp. 603-610.
Garg et al., High Level Communication Primitives for Concurrent Systems, IEEE, 1988, pp. 92-99.
Hastings et al., TCP/IP Spoofing Fundamentals, IEEE, May 1996, pp. 218-224.
Snapp, Signature Analysis and Communication Issues in a Distributed Intrusion Detection System, Master Thesis, University of California, Davis, California, 1991, pp. 1-40.
Guha et al., Network Security via Reverse Engineering of TCP Code: Vulnerability Analysis and Proposed Solutions, IEEE, Jul. 1997, pp. 40-48.
Djahandari et al., An MBone for an Application Gateway Firewall, IEEE, Nov. 1997, pp. 72-81.
Kim et al., Implementing a Secure Login Environment: A Case Study of Using a Secure Network Layer Protocol, Department of Computer Science, University of Alabama, Jun. 1995, pp. 1-9.
Satyanarayanan, Integrating Security in a Large Distributed System, Acm Transaction on Computer Systems, vol. 7, No. 3, Aug. 1989, pp. 47-280.
Sammons, Nathaniel, "Multi-platform Interrogation and Reporting with Rscan," The Ninth Systems Administration Conference, LISA 1995, Monterrey, California, Sep. 17-22, 1995, pp. 75-87.
Dean et al., "Java Security: From HotJava to Netscape and Beyond," Proceedings of the 1996 IEEE Symposium on Security and Privacy, May 6-8, 1996, Oakland, California, pp. 190-200.
Fisch et al., "The Design of an Audit Trail Analysis Tool," Proceedings of the 10$^{th}$ Annual Computer Security Applications Conference, Dec. 5-9, 1994, Orlando, Florida, pp. 126-132.
Safford et al., "The TAMU Security Package: An Ongoing Response to Internet Intruders in an Academic Environment," USENIX Symposium Proceedings, UNIX Security IV, Oct. 4-6, 1993, Santa Clara, California, pp. 91-118.
Sugawara, Toshiharu, "A Cooperative LAN Diagnostic and Observation Expert System," Ninth Annual Phoenix Conference on Computers and Communications, 1990 Conference Proceedings, Mar. 21-23, 1990, Scottsdale, Arizona, pp. 667-674.
Casella, Karen A., "Security Administration in an Open Networking Environment," The Ninth Systems Administration Conference, LISA 1995, Monterrey, California, Sep. 17-22, 1995, pp. 67-73.
Burchell, Jonathan, "Vi-SPY: Universal NIM?" Virus Bulletin, Jan. 1995, pp. 20-22.

Benzel et al., "Identification of Subjects and Objects in a Trusted Extensible Client Server Architecture," 18$^{th}$ National Information Systems Security Conference, Oct. 10-13, 1995, Baltimore, Maryland, pp. 83-99.
Epstein et al., "Component Architectures for Trusted Netware," 18$^{th}$ National Information Systems Security Conference, Oct. 10-13, 1995, Baltimore, Maryland, pp. 455-463.
Varadharajan, Vijay, "Design and Management of a Secure Networked Administration System: A Practical Approach," 19$^{th}$ National Information Systems Security Conference, Oct. 22-25, 1996, Baltimore, Maryland, pp. 570-580.
Snapp et al., "DIDS (Distributed Intrusion Detection System)—Motivation, Architecture, and An Early Prototype," 14$^{th}$ National Computer Security Conference, Oct. 1-4, 1991, Washington, DC, pp. 167-176.
Broner et al., "IntelligentI/O Rule-Based Input/Output Processing for Operating Systems," Operating Systems Review, vol. 25, No. 3, Jul. 1991, pp. 10-26.
Drews et al., "Special Delivery—Automatic Software Distribution Can Make You a Hero," Network Computing, Aug. 1, 1994, pp. 80, 82-86, 89, 91-95.
Morrissey, Peter, "Walls," Network Computing, Feb. 15, 1996, pp. 55-59, 65-67.
Harlander, Dr. Magnus, "Central System Administration in a Heterogenous Unix Environment: GeNUAdmin," Proceedings of the Eighth Systems Administration Conference (LISA VIII), Sep. 19-23, 1994, San Diego, California, pp. 1-8.
Shaddock et al., "How to Upgrade 1500 Workstations on Saturday, and Still Have Time to Mow the Yard on Sunday," The Ninth Systems Administration Conference LISA '95, Sep. 17-22, 1995, Monterrey, California, pp. 59-65.
Anderson, Paul, "Towards a High-Level Machine Configuration System," Proceedings of the Eighth Systems Administration Conference (LISA VIII), Sep. 19-23, 1994, San Diego, California, pp. 19-26.
Cooper, Michael A., "Overhauling Rdist for the '90s," Proceedings of the Sixth Systems Administration (LISA VI), Oct. 19-23, 1992, Long Beach, California, pp. 175-188.
Vangala et al., "Software Distribution and Management in a Networked Environment," Proceedings of the Sixth Systems Administration Conference, Oct. 19-23, 1992, Long Beach, California, pp. 163-170.
Kim et al., "The Design and Implementation of Tripwire: A File System Integrity Checker," 2$^{nd}$ ACM Conference on Computer and Communications Security, Nov. 2-4, 1994, Fairfax, Virginia, pp. 18-29.
Winn Schwartau, "e.Security™-Solving 'Dumb Days' With Security Visualization," e-Security, Inc., Naples, FL 34103, 2000.
Anita D'Amico, Ph.D., "Assessment of Open e-Security Platform™: Vendor-Independent Central Management of Computer Security Resources," Applied Visions, Inc., 1999.
"e.Security™-Open Enterprise Security Management: Delivering an integrated, automated, centrally Managed Solution You Can Leverage Today and Tomorrow," e-Security, Inc., Naples, FL 34102, 1999.
"e.Security™-Vision," e-Security, Inc., Naples, FL, 1999.
"e.Security™-Administrator Workbench™," e-Security, Inc. Naples, FL, 1999.
"e:Security™-Fact Sheet," e-Security, Inc., Naples, FL, 1999.
"e.Security™-Open e-Security Platform™," e-Security, Inc. Naples, FL, 1999.
Babcock, "E-Security Tackles The Enterprise," Jul. 28, 1999; *Inter@ctive* Week, www.Zdnet.com.
Kay Blough, "In Search of More-Secure Extranets," Nov. 1, 1999, www.InformationWeek.com.
Paul H. Desmond, "Making Sense of Your Security Tools," Software Magazine and Wiesner Publishing, www.softwaremag.com, 1999.
Kay Blough, "Extra Steps Can Protect Extranets," Nov. 1, 1999, www. InformationWeek.com.
Sean Hao, "Software protects e-commerce—e-Security's product alerts networks when hackers attack," Florida Today, Florida.
Scott Weiss; "Security Strategies—E-Security, Inc.," product brief, Hurwitz Group, Inc., Mar. 24, 2000.

Sean Adee, CISA, "Managed Risk, Enhanced Response—The Positive Impact of Real-Time Security Awareness," Information Systems Control Journal, vol. 2, 2000.

"Reprint Review—The Information Security Portal—Open e-Security Platform Version 1.0", Feb. 2000, West Coast Publishing, SC Magazine, 1999.

e.Security—"Introducing the First Integrated, Automated, and Centralized Enterprise Security Management System," white paper, e-Security, Inc., Naples, FL 34102, 1999.

Ann Harrison, "Computerworld—Integrated Security Helps Zap Bugs," Feb. 21, 2000, Computerworld, vol. 34, No. 8, Framingham, MA.

Shruti Daté, "Justice Department Will Centrally Monitor Its Systems For Intrusions," Apr. 3, 2000, Post-Newsweek Business Information, Inc., www.gcn.com.

e.Security™, website pages (pp. 1-83), www.esecurityinc.com, e-Security, Inc., Naples, FL 34103, Sep. 14, 2000.

Peter Sommer, "Intrusion Detection Systems as Evidence," Computer Security Research Centre, United Kingdom.

Musman et al., System or Security Managers Adaptive Response Tool, DARPA Information Survivability Conference and Exposition, Jan. 25, 2000, pp. 56-68.

Gibson Research Corporation Web Pages, Shields Up!—Internet Connection Security Analysis, grc.com/default.htm, Laguna Hills, California, 2000.

Rouse et al., Design and Evaluation of an Onboard Computer-Based Information System fro Aircraft, IEEE Transactions of Systems, Man, and Cybernetics, vol. SMC-12, No. 4, Jul./Aug. 1982, pp. 451-463.

Hammer, An Intelligent Flight-Management Aid for Procedure Execution, IEEE Transactions on Systems, Man, and Cybernetics, vol. SMC-14, No. 6, Nov./Dec. 1984, pp. 885-888.

Mann et al., Analysis of User Procedural Compliance in Controlling a Simulated Process, IEEE Transactions on Systems, Man, and Cybernetics, vol. SMC-16, No. 4, Jul./Aug. 1986.

Todd, Signed and Delivered: An Introduction to Security and Authentication, Find Out How the Jave Security API Can Help you Secure your Code, Javaworld, Web Publishing, Inc., San Francisco, Dec. 1, 1998, pp. 1-5.

Arvind, Secure This. Inform, Association for Information and Image Management, Silver Spring, Sep./Oct. 1999, pp. 1-4.

Stevens, TCP/IP Illustrated, vol. 1, 1994, pp. 247.

Lee et al., A Generic Virus Detection Agent on the Internet, IEEE, 30th Annual Hawaii International Conference on System Sciences, 1997, vol. 4.

Cutler, Inside Windows NT, 1993, Microsoft Press.

Duncan, Advanced MS-Dos, 1986, Microsoft Press.

McDaniel, IBM Dictionary of Computing, 1994, International Business Machines Corporation.

Burd, Systems Architecture, 1998, Course Technology, Second Edition.

Programmer's Guide PowerJ, 1997, Sybase.

Swimmer et al., Dynamic detection and classification of computer viruses using general behavior patterns, 1995, Proceedings of the Fifth International Virus Bulletin Conference, Boston.

Advanced Virus Detection Technology for the Next Millennium, Aug. 1999, Network Associates, A Network Associates Executive White Paper, pp. 1-14.

Enterprise-Grade Anti-Virus Automation in the 21st Century, Jun. 2000, Symantec, Technology Brief, pp. 1-17.

Kephart et al., Blueprint for a Computer Immune System, 1997, Retrieved from Internet, URL: http//www.research.ibm.com/antivirus/scipapers/kephart/VB97, pp. 1-15.

Richardson, Enterprise Antivirus Software, Feb. 2000, Retrieved from Internet, URL: http://www.networkmagazine.com/article/nmg20000426S0006, pp. 1-6.

Understanding and Managing Polymorphic Viruses, 1996, Symantec, The Symantec Enterprise Papers, vol. XXX, pp. 1-13.

Gong, JavaTM Security Architecture (JDK1.2), Oct. 2, 1998, Sun Microsystems, Inc., Version 1.0, pp. i-iv, 1-62.

Softworks Limited VBVM Whitepaper, Nov. 3, 1998, Retrieved from the Internet, URL: http://web.archive.org/web/19981203105455/http://softworksltd.com/vbvm.html, pp. 1-4.

Kephart, A Biologically Inspired Immune System for Computers, 1994, Artificial Life IV, pp. 130-139.

International Search Report for PCT/US01/26804 of Mar. 21, 2002.

Kosoresow et al., Intrusion Detection via System Call Traces, IEEE Software, pp. 35-42, Sep./Oct. 1997.

Veldman, Heuristic Anti-Virus Technology, Proceedings, 3rd International Virus Bulletin Conference, pp. 67-76, Sep. 1993.

Symantec, Understanding Heuristics: Symantec's Bloodhound Technology, Symantec White Paper Series, vol. XXXIV, pp. 1-14, Sep. 1997.

Nachenberg, A New Technique for Detecting Polymorphic Computer Viruses, A thesis submitted in partial satisfaction of the requirements for the degree Master of Science in Computer Science, University of California Los Angeles, pp. 1-127, 1995.

Microsoft P-Code Technology, http://msdn.microsoft.com/archive/default.asp?url=/archive/en-us/dnarvc/html/msdn_c7pcode2.asp, pp. 1-6, Apr. 1992.

DJGPP COFF Spec, http://delorie.com/djgpp/doc/coff/, pp. 1-15, Oct. 1996.

Natvig, Sandbox Technology Inside AV Scanners, Virus Bulletin Conference, Sep. 2001, pp. 475-488.

Norman introduces a new technique for eliminating new computer viruses, found on Norman's website, file:///c:/documents%20and%20settings\7489\local%20settings\temporary%20internet%20files\olk, pp. 1-2, published Oct. 25, 2001, printed from website Dec. 27, 2002.

International Search Report for PCT/US01/19142 of Jan. 17, 2003.

Using the CamNet BBS FAQ, http://www.cam.net.uk/manuals/bbsfaq/bbsfaq.htm, Jan. 17, 1997.

Express Storehouse Ordering System, "Accessing ESOS through the Network", http://www-bfs.ucsd.edu/mss/esos/man3.htm, Sep. 3, 1996.

NASIRE, NASIRC Bulletin #94-10, http://cs-www.ncsl.nist.gov/secalert/nasa/nasa9410.txt, Mar. 29, 1994.

Packages in the net directory, http://linux4u.jinr.ru/usoft/WWW/www_debian.org/FTP/net.html, Mar. 20, 1997.

Sundaram, An Introduction to Intrusion Detection, Copyright 1996, published at www.acm.org/crossroads/xrds2-4/intrus.html, pp. 1-12.

Samfat, IDAMN: An Intrusion Detection Architecture for Mobile Networks, IEEE Journal on Selected Areas in Communications, vol. 15, No. 7, Sep. 1997, pp. 1373-1380.

INFO: Visual Basic Supports P-Code and Native Code Compilation (Q229415), http://support.micorsoft.com/support/kb/articles/Q229/4/15.ASP, pp. 1-2, Apr. 28, 1999.

International Search Report for PCT/US99/29117 of May 2, 2000.

Nordin, U of MN OIT Security and Assurance, Feb. 9, 2000.

Internet Security Systems, RealSecure SiteProtector, SAFEsuite Decisions to SiteProtector Migration, Aug. 8, 2003, pp. 1-42.

Internet Security Systems, SAFEsuite Enterprise, SAFEsuite Decisions, 1998.

Internet Security Systems, SAFEsuite Enterprise, Recognizing the Need for Enterprise Security: An Introduction to SAFEsuite Decisions, Aug. 1998, pp. 1-9.

Internet Security Systems, SAFEsuite Decisions 2.6, Frequently Asked Questions, Feb. 21, 2001, pp. 1-10.

Internet Security Systems, SAFEsuite Decisions Version 1.0, User's Guide, 1998, pp. 1-78.

Porras et al., Emerald: Event Monitoring Enabling Responses to Anomalous Live Disturbances, Computer Science Laboratory, SRI International, Menlo Park, CA, Oct. 1997, pp. 353-365.

Cisco Systems, Empowering the Internet Generation, 1998.

Messmer, Start-Up Puts Hackers on BlackICE, Network World Fusion, http://www.nwfusion.com/cgi-bin/mailto/x/cgi, Apr. 21, 1999, p. 1-2.

NeworkICE Corporation, Can You Explain How Your Product Can Protect a Remote User with a VPN Client?, 1998-1999, pp. 1-2, http://www.webarchive.org/web/20000304071415/advice.networkice.com/advice/support/kb/q000003/default.

Yasin, Start-Up Puts Network Intruders on Ice, http://www.internetweek.com/story/INW19990505S0001, May 5, 1999, pp. 1-2.

Morency, NetworkWorldFusion, http://nwfusion.com/cgi-bin/mailto/x.cgi, Jun. 28, 1999, pp. 1-2.

Rogers, Network ICE Touts Security Wares, Apr. 23, 1999, San Mateo, California, http://www.crn.com/showArticle.jhtml?articleID=18829106&flatPage=true, pp. 1-2.
Rogers, Network ICE Signs Resellers, May 26, 1999, San Mateo, California, http://www.crn.com/showArticle.jhtml?articleID=18805302&flatPage=true, pp. 1-2.
Internet Security Systems, I've Been Attacked! Now What?, Aug. 27, 1999, http://www.iss.net/security_center/advice/Support/KB/q000033/default.htm, pp. 1-2.
Internet Security Systems, What is the Format of "Attack-List.CSV"?, Aug. 21, 1999, http://www.iss.net/security_center/advice/Support/KB/q000018/default.htm, pp. 1-2.
Neumann et al., Experience with Emerald to Date, Apr. 11-12, 1999, 1st USENIX Workshop on Intrusion Detection and Network Monitoring, Santa Clara, California, pp. 1-9.
Lindqvist et al., Detecting Computer and Network Misuse Through the Production-Based Expert System Toolset (P-BEST), May 9-12, 1999, Proceedings of the 1999 IEEE Symposium on Security and Privacy, Oakland, California, pp. 1-16.
Kendall, A Database of Computer Attacks for the Evaluation of Intrusion Detection Systems, Jun. 1999, Department of Defense Advanced Research Projects Agency, pp. 1-124.
Neumann, Computer Security and the U.S. Infrastructure, Nov. 6, 1997, Congressional Testimony, pp. 1-11.
Porras et al., Life Traffic Analysis of TCP/IP Gateways, Nov. 10, 1997, Internet Society's Networks and Distributed Systems Security Systems Symposium, Mar. 1998, http://www.sdl.sri.com/projects/emerald/live-traffic.html, pp. 1-16.
Raynaud et al., Integrated Network Management IV, 1995, Proceedings of the 4th International Symposium on Integrated Network Management, pp. 1-2 and 5-16.
Heberlein et al., A Method to Detect Intrusive Activity in a Networked Environment, Oct. 1-4, 1991, 14th National Computer Security Conference, Washington, D.C., pp. 362-363 and 365-371.
Ko et al., Execution Monitoring of Security-Critical Programs in Distributed Systems: A Specification-Based Approach, 1997, Proceedings of the 1997 IEEE Symposium on Security and Privacy, pp. 175-187.
Crosbie et al., Active Defense of a Computer System Using Autonomous Agents, Technical Report No. 95-008, Feb. 15, 1995, Purdue University, West Lafayette, Indiana, pp. 1-14.
Mansouri-Samani et al., Monitoring Distributed Systems, Nov. 1993, IEEE Network, pp. 20-30.
Jakobson et al., Alarm Correlation, Nov. 1993, IEEE Network, pp. 52-59.
Anderson et al., Next-Generation Intrusion Detection Expert (NIDES), A Summary, May 1995, SRI International, pp. 1-37.
Veritas Software, Press Release, Robust Enhancements in Version 6.0 Maintain Seagate WI as the De Ficto Standard for Software Distribution, Oct. 6, 1997, Press Releases, pp. 1-4, http://216.239.39.104/search?q=cache:HS9kmK1m2QoJ:www.veritas.com/us/aboutus/pressroom/199....
Yasin, Network-Based IDS are About to Stop Crying Wolf, Security Mandate: Silence False Alarms, Apr. 9, 1999, http://lists.jammed.com/ISN/1999/04/0021.html, pp. 1-3.
Internet Security Systems, Press Release, ISS Reports Record Revenues and Net Income for Second Quarter, Jul. 19, 1999, http://bvlive01.iss.net/issEn/delivery/prdetail.jsp?type=Financial&oid=14515, pp. 1-5.
LaPadula, State of the Art in CyberSecurity Monitoring, A Supplement, Sep. 2001, Mitre Corporation, pp. 1-15.
Balasubramaniyan et al., An Architecture for Intrusion Detection Using Autonomous Agents, Jun. 11, 1998, Purdue University, West Lafayette, Indiana, pp. 1-4, http://gunther.smeal.psu.edu/images/b9/f3/bb/9e/ba7f39c3871dcedeb9abd0f70cb84607/1.png.
Crosbie et al., Active Defense of a Computer System Using Autonomous Agents, Feb. 15, 1995, Technical Report No. 95-008, Purdue University, West Lafayette, Indiana, pp. 1-14.
Crosbie et al., Defending a Computer System Using Autonomous Agents, Mar. 11, 1994, Technical Report No. 95-022, Purdue University, West Lafayette, Indiana, pp. 1-11.
Denning, An Intrusion-Detection Model, Feb. 1987, IEEE Transactions on Software Engineering, vol. SE-13, No. 2, pp. 1-17.

Lunt, A Survey of Intrusion Detection Techniques, 1993, Computers & Security, 12 (1993), pp. 405-418.
Porras et al., Penetration State Transition Analysis a Rule-Based Intrusion Detection Approach, 1992, pp. 220-229.
Javitz et al., The NIDES Statistical Component: Description and Justification, SRI International, Menlo Park, California, SRI Project 3131, Mar. 7, 1994.
Lindqvist et al., Detecting Computer and Network Misuses Through the Production-Based Expert System Toolset (P-BEST), Oct. 25, 1998, pp. 1-20.
Javitz et al., The SRI IDES Statistical Anomaly Detector, SRI Internationa, Menlo Park, California, May 1991, IEEE Symposium on Security and Privacy, pp. 1-11.
Porras et al., Live Traffic Analysis of TCP/IP Gateways, Nov. 10, 1997, SRI International, Menlo Park, California, pp. 1-16.
Porras et al., Live Traffic Analysis of TCP/IP Gateways, Dec. 12, 1997, SRI International, Menlo Park, California, Proceedings of the 1998 ISOC Symposium on Network and Distributed Systems Security, pp. 1-13.
Information & Computing Sciences: System Design Laboratory: Programs: Intrusion Detection, SRI International, http://www.sdl.sri.com/programs/intrusion/, Jun. 17, 2004, pp. 1-2.
Lindqvist et al., eXpert-BSM: A Host-based Intrusion Detection Solution for Sun Solaris, SRI International, Menlo Park, California, Dec. 10-14, 2001, Proceedings of the 17th Annual Computer Security Applications Conference, pp. 1-12.
Almgren et al., Application-Integrated Data Collection for Security Monitoring, Oct. 10-12, 2001, SRI International, Menlo Park, California, pp. 1-15.
Debar et al., Research Report: A Revised Taxonomy for Intrusion-Detection Systems, Oct. 25, 1999, IBM Research, Switzerland, pp. 1-23.
Porras et al., Emerald: Event Monitoring Enabling Responses to Anomalous Live Disturbances, Computer Science Laboratory, SRI International, Menlo Park, CA, Dec. 18, 1996, pp. 1-3.
Frequently-Asked Questions about RealSecure, pp. 1-14, http://web.archive.org/web/19970721183227/iss.net/prod/rs_faq.html, May 30, 1997.
Cisco Systems, Inc., Empowering the Internet Generation, 1998.
Internet Security Systems, Inc., RealSecure Release 1.2 for UNIX, A User Guide and Reference Manual, 1997.
Internet Security Systems, Inc., Real-time attack recognition and response: A solution for tightening network security, Jan. 1997, pp. 1-13.
Internet Security Systems, Inc., SAFEsuite Decisions User Guide, Version 1.0, 1998, pp. 1-78.
NetworkICE Corporation, ICEcap Administrator's Guide, Version 1.0 BETA, 1999, pp. 1-142.
Debar, Herve et al., A Neural Network Component for an Intrusion Detection System, 1992, pp. 240-250.
SRI International, A Prototype IDES: A Real-Time Intrusion-Detection Expert System, Aug. 1987, p. 1-63.
SRI International, Requirements and Model for IDES—A Real-Time Intrusion-Detection Expert System, Aug. 1985, pp. 1-70.
SRI International, An Intrusion-Detection Model, Nov. 1985, pp. 1-29.
Dowell et al., The ComputerWatch Data Reduction Tool, Proc. of the 13th National Computer Security Conference, Washington, D.C., Oct. 1990, pp. 99-108.
Fox et al., A Neural Network Approach Towards Intrusion Detection, Jul. 2, 1990, pp. 125-134.
Garvey et al., Model-Based Intrusion Detection, Oct. 1991, pp. 1-14.
Ilgun et al., State Transition Analysis: A Rule-Based Intrusion Detection Approach, Mar. 1995, pp. 181-199.
Javitz et al., The SRI IDES Statistical Anomaly Detector, May 1991, pp. 1-11.
SRI International, The NIDES Statistical Component Description and Justification, Mar. 7, 1994, pp. 1-46.
Karen, Oliver, PC Magazine, The Digital Doorman, Nov. 16, 1999, p. 68.
Liepins et al., Anomaly Detection: Purpose and Frameowrk, 1989, pp. 495-504.

Lindqvist et al., Detecting Computer and Network Misuse Through the Production-Bases Expert System Toolset (P-BEST), Oct. 25, 1998, pp. 1-20.

Lunt, Teresa, A survey of intrusion detection techniques, 1993, pp. 405-418.

Lunt, Teresa, Automated Audit Trail Analysis and Intrusion Detection: A Survey, Oct. 1988, pp. 1-8.

Porras et al., Penetration State Transition Analysis a Rule-Based Intrusion Detection Approach, 1992, pp. 220-229.

Sebring et al., Expert Systems in Intrusion Detection: A Case Study, Oct. 1988, pp. 74-81.

Shieh et al., A Pattern-Oriented Intrusion-Detection Model and Its Applications, 1991, pp. 327-342.

Smaha, Stephen, Haystack: An Intrusion Detection System, 1988.

Snapp, Steven Ray, Signature Analysis and Communication Issues in a Distributed Intrusion Detection System, 1991, pp. 1-40.

Porras et al., EMERALD: Event Monitoring Enabling Responses to Anomalous Live Disturbances, Oct. 1997, pp. 353-365.

Lunt et al., Knowledge-Based Intrusion Detection, Mar. 1989, pp. 102-107.

Lunt et al., An Expert System to Classify and Sanitize Text, Dec. 1987, pp. 1-5.

Tener, William, Computer Security in the Age of Information, AI & 4GL: Automated Detection and Investigation Tools, 1989, pp. 23-29.

Teng et al., Adaptive Real-time Anomaly Detection Using Inductively Generated Sequential Patterns, 1990, pp. 278-284.

Vaccaro et al., Detection of Anomalous Computer Session Activity, 1989, pp. 280-289.

Winkler, J.R., A UNIX Prototype for Intrusion and Anomaly Detection in Secure Networks, 1990, pp. 115-124.

Boyen et al. Tractable Inference for Complex Stochastic Process, Jul. 24-26, 1998.

Copeland, Observing Network Traffic—Techniques to Sort Out the Good, the Bad, and the Ugly, 2000, pp. 1-7.

Goan, Terrance, Communications of the ACM, A Cop on the Beat Collecting and Appraising Intrusion Evidence, Jul. 1999, pp. 47-52.

Heberlein et al., A network Security Monitor, 1990, pp. 296-304.

Jackson et al., An Expert System Applications for Network Intrusion Detection, Oct. 1991, pp. 1-8.

Lankewicz et al., Real-Time Anomaly Detection Using a Nonparametric Pattern Recognition Approach, 1991, pp. 80-89.

Lippman et al., Evaluating Intrusion Detection Systems: The 1998 DARPA Off-line Intrusion Detection Evaluation, 1999.

Munson et al., Watcher: The Missing Piece of the Security Puzzle, Dec. 2001.

Pearl, Judea, Probabilistic Reasoning in Intelligent Systems: Networks of Plausible Inference, Sep. 1988.

Porras et al., Live Traffic Analysis of TCP/IP Gateways, Dec. 12, 1997, pp. 1-13.

EMERALD TCP Statitical Analyzer 1998 Evaluation Results, http://www.sdl.sri.com/projects/emerald/98-eval-estat/index.html, Jul 9, 1999, pp. 1-15.

Staniford-Chen, GrIDS—A Graph Based Intrusion Detection System for Large Networks, Oct. 1996.

Tener, William, Discovery: An Expert System in the Commercial Data Security Environment, Dec. 1986, pp. 45-53.

Valdes et al., Adaptive, Model-Based Monitoring for Cyber Attack Detection, 2000, pp. 1-19.

SRI International, Blue Sensors, Sensor Correlation, and Alert Fusion, Oct. 4, 2000.

Valdes et al., Statistical Methods for Computer Usage Anomaly Detection Using NIDES, Jan. 27, 1995, pp. 306-311.

Wimer, Scott, The Core of CylantSecure, http://www.cylant.com/products/core.html, 1999, pp. 1-4.

Zhang et al., A Hierarchical Anomaly Network Intrusion Detection System using Neural Network Classification, Feb. 2001.

Cisco Secure Intrusion Detection System 2.1.1 Release Notes, http://www.cisco.com/univercd/cc/td/doc/product/iaabu/csids/csids3/nr211new.htm, Jun. 10, 2003, pp. 1-29.

Linux Weekly News, http://lwn.net/1998/0910shadow.html, Sep. 8, 1998, pp. 1-38.

Cracker Tracking: Tighter Security with Intrucsion Detection, http://www.byte.com/art/9805/sec20/artl.htm, May 1998, pp. 1-8.

Cisco Systems, Inc., Newtork RS: Intrusion Detection and Scanning with Active Audit Session 1305, 1998.

Business Security Advisor Magazine, Intrusion Detection Systems: What You Need to Know, http://advisor.com/doc/0527, Sep. 1998, pp. 1-7.

Garvey et al., An Inference Technique for Integrating Knowledge from Disparate Sources, Multisensor Integration and Fusion for Intelligenct Machines and Systems, 1995, pp. 458-464.

Power et al., CSI Intrusion Detection System Resource, Jul. 1998, pp. 1-7.

Cisco Systems, Inc., NetRanger User's Guide Version 2.1.1, 1998.

Internet Security Systems, Real-Time Attack Recognition and Response: A Solution for Tightening Network Security, http://www.iss.net, 1997, pp. 1-13.

Network ICE Corporation, Network ICE Product Documentation, pp. 1-3, http://www.web.archive.org/web/20011005080013/www.networkice.com/support/documentation.html, Jul. 6, 2004.

Network ICE Corporation, Network ICE Documentation, p. 1, http://www.web.archive.org/web/19991109050852/www.networkice.com/support/docs.htm, Jul. 6, 2004.

Network ICE Corporation, Network ICE Press Releases, p. 1, http://www.web.archive.org/web/19990903214428/www.netice.com/company/pressrelease/press.htm, Jul. 7, 2004.

Network ICE Corporation, Network ICE Press Releases, p. 1, http://www.web.archive.org/web/20000304074934/www.netice.com/company/pressrelease/press.htm, Jul. 7, 2004.

Brentano et al., An Architecture for Distributed Intrusion Detection System, Department of Energy Computer Security Group, 14th Annual Conference Proceedings, pp. (17)25-17(45), May 1991.

Staniford-Chen et al., GrIDS—A Graph Based Intrusion Detection System for Large Networks, University of California, Davis, California, 19th National Information Systems Security Conference, 1996, pp. 1-10.

Ricciulli et al., Modeling Correlated Alarms in Network Management Systems, SRI International, Menlo Park, California, , Proceedings of the Conference on Communication Networks and Distributed System Modeling and Simulation, 1997, pp. 1-8.

Porras et al., Emerald: Event Monitoring Enabling Responses to Anomalous Live Disturbances, SRI International, Menlo Park, California, 20th National Information Systems Security Conference, Oct. 1997, pp. 1-24.

Porras et al., A Mission-Impact Based Approach to INFOSEC Alarm Correlation, SRI International, Menlo Park, California, Oct. 2002, pp. 1-33.

Phrack 55 Download (234 kb, Sep. 9, 1999), http://www.phrack.org/show.php?p=55&a=9, pp. 1-6.

Porras et al., A Mission-Impact-Based Approach to INFOSEC Alarm Correlation, SRI International, Menlo Park, California, Oct. 2002, pp. 1-19.

Bace, An Introduction to Intrusion Detection and Assessment for System and Network Security Management, 1999, pp. 1-38.

Hunteman, Automated Information System—(AIS) Alarm System, University of California, Los Alamos National Laboratory, 20th National Information System Security Conference, Oct. 1997, pp. 1-12.

Janakiraman et al., Indra: A Peer-to-Peer Approach to Network Intrusion Detection and Prevention, Proceedings of the 12th International Workshop on Enabling Technologies: Infrastructure for Collaborative Enterprises, 2003, pp. 1-5.

Innella, Intrusion Detection Systems (IDS), Navy Information Assurance, Jun. 28, 2004, pp. 1-4, http://www.infosec.navy.mil/ps/?t=infosecprodsservices/infosecprodsservices.tag&bc=/infosecprodsservices/b....

Curry, Intrusion Detection Systems, IBM Emergency Response Service, Coast Laboratory, http://www.cerias.purdue.edu/about/history/coast_resources/idcontent/ids.html, Jul. 19, 2004, pp. 1-28.

Lunt et al., Knowledge-Based Intrusion Detection, SRI International, Menlo Park, California, Conference on AI Systems in Government, Washington, D.C., Mar. 1989, pp. 102-107.

A. Information Assurance BAA 98-34 Cover Sheet, SRI International, Nov. 1, 2000, pp. 2-35.

NetScreen Products, FAQ, http://www.netscreen.com/products/faq.html, Feb. 28, 2003, pp. 1-6.

Miller, A Network Under Attack: Leverage Your Existing Instrumentation to Recognize and Respond to Hacker Attacks, NetScout Systems, Westford, MA, Apr. 2003, pp. 1-8.

Technology Brief: Intrusion Detection for the Millennium, Internet Security Systems, 2000, pp. 1-6.

Weiss et al., Analysis of Audit and Protocol Data using Methods from Artificial Intelligence, Siemens AG, Munich, Germany, Proc. of the 13$^{th}$ National Computer Security Conference, Washington, D.C., Oct. 1990, pp. 109-114.

Snapp et al., DIDS (Distributed Intrusion Detection System)—Motivation, Architecture, and an Early Protype), University of California, Davis California, , Proc. 14$^{th}$ National Computer Security Conference, Washington, D.C., Oct. 1991, pp. 167-176.

Internet Security Systems, Inc., SAFEsuite Enterprise Edition, Project "Gatekeeper" 1.0, Market Requirements Document, Mar. 30, 1998, pp. 1-12.

Internet Security Systems, SAFEsuite Decisions, 2000, pp. 1-2.

Internet Security Systems, Dynamic Threat Protection, Presse-Roundtable, Munich, Germany, Apr. 10, 2003, pp. 1-63.

Internet Security Systems, Preliminary ODM 1.0 Functional Specification, Aug. 1997, pp. 1-7.

Internet Security Systems, Inc., Scanner-ISSDK Interface, Design Specification, Jun. 2, 2000, Draft 1.07, pp. 1-7.

RealSecure, Adaptive Network Security Manager Module Programmer's Reference Manual, pp. 1-74.

Advanced Concept Technology Demonstrations (ACTD), 2005, pp. 1-28.

Frank, Sounding the Alarm, Sep. 6, 1999, Federal Computer Week, pp. 1-2.

Crumb, Intrusion Detection Systems to be Integrated at AFRL, Air Force Research Laboratory, News@ AFRL, Fall 1999, pp. 1.

Temin, Case Study: The IA: AIDE System at Two, 15$^{th}$ Annual Computer Security Applications Conference, Dec. 6-10, 1999, Phoenix, Arizona, pp. 1-26.

Spink, Automated Intrusion Detection Environment (AIDE), Intrusion Detection Sensor Fusion, Sep. 7, 1999, pp. 1-25.

Frincke et al., A Framework for Cooperative Intrusion Detection, 21$^{st}$ National Information Systems Security Conference, Oct. 6-9, 1998, Crystal City, Virginia, pp. 1-20.

Anderson et al., In Athena's Camp: Preparing for Conflict in the Information Age, An Exploration of Cyberspace Security R&D Investment Strategies for DARPA: The Day After-in Cyberspace II, Chaper Eleven, 1996, pp. 253-271.

Valdes et al., SRI International, Probabilistic Alert Correlation, 2001, pp. 1-15.

Bass, Multisensor Data Fusion for Next Generation Distributed Intrusion Detection Systems, Apr. 28, 1999, Iris National Symposium, pp. 1-6.

Perrochon et al., Enlisting Event Patterns for Cyber Battlefield Awareness, No Date, Stanford University, pp. 1-12.

Perrochon, Using Context-Based Correlation in Network Operations and Management, Jul. 2, 1999, Stanford University, pp. 1-20.

Perrochon, Real Time Event Based Analysis of Complex Systems, Jun. 1998, pp. 1-9.

Luckham et al., Complex Event Processing in Distributed Systems, Aug. 18, 1988, Stanford University, pp. 1-26.

Pettigrew, US Southcom United States Southern Command's Information Sharing Projects, Summer 1999, IAnewsletter, vol. 3, No. 1, pp. 1-24.

Levitt et al., CMAD IV, Computer Misuse & Anomaly Detection, Session Summaries, Nov. 12-14, 1996, Proceedings of the Fourth Workshop on Future Directions in Computer Misuse and Anomaly Detection, Monterey, California, pp. 1-86.

Cheung et al., The Design of GrIDS: A Graph-Based Intrusion Detection System, Jan. 26, 1999, University of California, pp. 1-51.

Cohen et al., Report of the Reporting and Analysis Track, Detection of Malicious Code, Intrusions, and Anomalous Activities Workshop, Feb. 22-23, 1999, pp. 1-47.

Garofalakis et al., Network Mining and Analysis: The Nemesis Project, Bell Labs, Lucent Technologies, No Date, pp. 1-12.

RealSecure ICEcap Manager User Guide Version 3.6, Internet Security Systems, Inc., 1998-2002, pp. 1-228.

Cuppens, Cooperative Intrusion Detection, Date Unknown, pp. 1-10.

Mukherjee et al., Network Intrusion Detection, IEEE Network, May/Jun. 1994, pp. 26-41.

Machlis, Net Monitoring Tools Gain Real-Time Alerts, Apr. 14, 1997, http://www.computerworld.com, pp. 1-12.

OmniGuard/ITA Intruder Alert, AXENT Technologies, Inc., Nov. 17, 2004, http://www.web.archive.org, pp. 1-10.

NetRanger Overview, Chapter 1, Date Unknown, pp. 1-16.

Sutterfield, Large-Scale Network Intrusion Detection, 1997, WheelGroup Corporation, pp. 1-10.

Kumar et al., An Application of Pattern Matching in Intrusion Detection, Technical Report No. CSD-TR-94-013, Jun. 17, 1994, Purdue University, pp. 1-55.

Huang et al., A Large-Scale Distributed Intrusion Detection Framework Based on Attack Strategy Analysis, Date Unknown, The Boeing Company, pp. 1-12.

Perrochon et al., Event Mining with Event Processing Networks, Date Unknown, Stanford University, pp. 1-4.

Gruschke, Integrated Event Management: Event Correlation Using Dependency Graphs, presented at DSOM 1998, University of Munich, pp. 1-12.

Bass, Intrusion Detection System and Multisensor Data Fusion, Apr. 2000, Communications of the ACM, vol. 43, No. 4, pp. 99-105.

Bass et al., A Glimpse into the Future of ID, Date Unknown, Usenix, pp. 1-10.

LaPadula, State of the Art in Anomaly Detection and Reaction, Jul. 1999, Mitre Corporation, pp. 1-36.

Rationalizing Security Events with Three Dimensions of Correlation, Date Unknown, NetForensics, Tech Brief, pp. 1-6.

Jou et al., Design and Implementation of a Scalable Intrusion Detection System for the Protection of Network Infrastructure, Date Unknown, MCNC, pp. 1-15.

Caldwell, Event Correlation: Security's Holy Grail?, Aug. 1, 2002, GuardedNet, pp. 1-21.

Metcalf et al., Intrusion Detection System Requirements, Sep. 2000, Mitre Corporation, pp. 1-33.

Jou et al., Architecture Design of a Scalable Intrusion Detection System for the Emerging Network Infrastructure, Technical Report CDRL A005, Apr. 1997, MCNC, pp. 1-42.

Security Manager for UNIX Systems Version 3.2.1 User's Guide, Feb. 1998, Internet Security Systems, pp. 1-162.

RealSecure Release 1.2 for UNIX A User Guide and Reference Manual, 1997, Internet Security Systems, Inc., pp. 1-92.

Internet Scanner SAFE SAFEsuite 4.0 User Guide and Reference Manual, 1996, Internet Security Systems, Inc., pp. 1-158.

Internet Scanner 3.3 User Guide and Reference Manual, 1996, Internet Security Systems, Inc., pp. 1-119.

Landwehr et al., Newsletter of the IEEE Computer Society's TC on Security and Privacy Electronics, Electronic CIPHER, Nov. 25, 1997, Issue 25, pp. 1-34.

20$^{th}$ National Information Systems Security Conference, Oct. 6-10, 1997, Baltimore, Maryland, pp. 1-44.

EMERALD Alert Management Interface User's Guide Version 1.2, Dec. 6, 2000, SRI International, pp. 1-11.

Anderson et al., Detecting Unusual Program Behavior Using the Statistical Component of the Next-Generation Intrusion Detection Expert System (NIDES), May 1995, SRI International, pp. 1-89.

Lunt et al., Detecting Intruders in Computer Systems, 1993 Conference on Auditing and Computer Technology, SRI International, pp. 1-17.

Network ICE Products—ICEcap, Date Unknown, pp. 1-2.

Forlanda, The Secrets to Driving on BlackICE, Jan. 12, 2000, Network ICE, pp. 1-35.

BlackICE User's Guide Version 1.0 Beta Draft, 1999, Network ICE Corporation, pp. 1-59.

ICEcap Administrator's Guide Version 1.0 Beta Draft, 1999, Network ICE Corporation, pp. 1-25.

Shulak et al., ICEcap Advanced Administration Guide Version 3.0, 2001, Internet Security Systems Corporation, pp. 1-51.

"Real Secure, OS Sensor User Guide," Version 5.0, © Internet Security Systems, Inc. 199?-2000; Sep. 2000, pp. 1-64.

"Real Secure, User's Guide," Version 3.0, © 1992-1998, Internet Security Systems, Inc., pp. 1-128.

"System Security Scanner, User Guide," Version 1.6, © 1996-1998, Internet Security Systems, Inc., pp. 1-164.
"Real Secure™, Network Engine User Guide," Version 3.2.1, © 1999 by Internet Security Systems, Inc., pp. 1-38.
"Real Secure™, User Guide," Version 3.2.1, © 1999 by Internet Security Systems, Inc., pp. 1-38.
"Real Secure™, Manager for HP OpenView User Guide," Version 1.3, © 1999 by Internet Security Systems, Inc., pp. 1-48.
"Database Scanner, User Guide," Version 2.0, © 1992-1999, Internet Security Systems, Inc., pp. 1-112.
"Database Scanner™, User Guide," Version 4.0, © 2000 by Internet Security Systems, Inc., pp. 1-122.
"Database Scanner™, User Guide," Version 3.0.1, © 1999 by Internet Security Systems, Inc., pp. 1-164.
"Real Secure™, Network Sensor User Guide," Version 5.0, © 2000 by Internet Security Systems, Inc., pp. 1-42.
"Real Secure, Server Sensor User Guide," Version 5.5, © Internet Security Systems, Inc. 2000, pp. 1-56.
"Internet Scanner™, User Guide," Version 6.0, Copyright © 1999 by Internet Security Systems, Inc., pp. 1-182.
"Internet Scanner™, User Guide," Version 6.1, © 2000 by Internet Security Systems, Inc., pp. 1-226.
"Internet Scanner™, User Guide," Version 5.6, © 1992-1998, Internet Security Systems, Inc., pp. 1-162.
"Internet Scanner™, User Guide," Version 5.3, © 1992-1998, Internet Security Systems, Inc. pp. 1-173.
"Real Secure, Console User Guide," Version 5.5, © 199?-2000, Internet Security Systems, Inc., pp. 1-162.
"Internet Scanner™, User Guide," Version 5.8, © 1999 by Internet Security Systems, Inc., pp. 1-148.
"SAFEsuite Decisions, User Guide," Version 1.0, © 1992-1998, Internet Security Systems, Inc., pp. 1-88.
"Real Secure™, Console User Guide," Version 5.0, © 2000 by Internet Security Systems, Inc., pp. 1-114.
"SAFEsuite Decisions, User Guide," Version 2.5, © 2000 by Internet Security Systems, Inc., pp. 1-194.
"System Scanner, User Guide," Version 1.7, © 1992-1998, Internet Security Systems, Inc., pp. 1-248.
"Sytem Scanner, User Guide," Version 1.0, © 1996-1998, Internet Security Systems, Inc., pp. 1-140.
"System Scanner™, User Guide," Version 4.0, © 1999 by Internet Security Systems, Inc., pp. 1-178.
Internet Security Systems, Inc., "Introduction to RealSecure Version 5.0, The Industry's Only Integrated Host-Based and Network-Based Intrusion Detection System", Aug. 22, 2000, pp. 1-47.
Internet Security Systems, Inc., "RealSecure Network Sensor and Gigabit Network Sensor Policy Guide Version 7.0", Aug. 2003, pp. 1-86.
Internet Security Systems, Inc., "RealSecure Console User Guide Version 3.1", Jun. 1999, pp. 1-98.
Internet Security Systems, Inc., "RealSecure Version 2.0", Apr. 1998, pp. 1-154.
Internet Security Systems, Inc., "Enhanced Dynamic Threat Protection via Automated Correlation and Analysis", an ISS White Paper, 2002, pp. 1-14.
Internet Security Systems, Inc., "RealSecure Site Protector Comparison Guide for Internet Scanner 7.0 Reporting Version 1.2", Mar. 2003, an ISS Tech Note, pp. 1-15.
Internet Security System, Inc., "RealSecure Site Protector Comparison Guide for ICEcap Manager Version 1.5", Jan. 2002, an ISS Technical White Paper, pp. 1-27.
Internet Security Systems, Inc., "RealSecure SiteProtector Security Fusion Module 2.0 Frequently Asked Questions", Mar. 2003, pp. 1-8.
Internet Security Systems, Inc., "RealSecure SiteProtector Console User Reference Guide Version 2.0 Service Pack 1", Mar. 14, 2003, Chapter 3, pp. 1-27.
Internet Security Systems, Inc., "Proventia Gateway and Network Protection", Jul. 2003, pp. 1-12.
Farley, Internet Security System, Inc., "ID Fusion Technology, A First-Generation Approach", Apr. 29, 1999, National Security Framework Forum, pp. 1-8.
Farley, "RealSecure Fusion Engine Concepts", an ISS White Paper, Jun. 30, 1999, pp. 1-23.
McGraw et al., "Secure Computing with Java: Now and the Future", 1997, http://java.sun.com/security/javaone97-whitepaper.html, pp. 1-20.

* cited by examiner

FIG. 16

SYSTEM AND METHOD FOR MANAGING SECURITY EVENTS ON A NETWORK

PRIORITY AND RELATED APPLICATIONS

The present application claims priority to provisional patent application entitled, "Event Manager for Network Security System," filed on Apr. 28, 2000 and assigned U.S. Application Ser. No. 60/200,313. The present application is also related to non-provisional application entitled, "Method and System for Managing Computer Security Information," filed on Apr. 27, 2001, and to non-provisional application entitled "Method and System for Creating a Record for One or More Computer Security Incidents," filed on Oct. 10, 2000 and assigned U.S. application Ser. No. 09/685,285.

TECHNICAL FIELD

The present invention is generally directed to managing security events on a network. More specifically, the present invention facilitates the collection and analysis of large amounts of security event data received from security devices for a distributed computer network.

BACKGROUND OF THE INVENTION

The security of computing networks is an increasingly important issue. With the growth of the Internet and the World Wide Web, people rely on computing networks to transfer and store more and more valuable information. This is particularly true in the context of local area networks (LANs) used by companies, schools, organizations, and other enterprises. LANs are used by groups of people to communicate and store documents and information. In the past, the security of computing networks was monitored by security devices placed on the network. Security devices generally comprise a sensor operable for generating a signal when it detects a certain event on the computing network. Security devices can also comprise components for managing and analyzing the data.

As more people began using computing networks more frequently, the networks have grown tremendously. With the growth in the size of networks and the importance of information available on the networks, there is a corresponding need for greater security monitoring. One approach to fulfilling this need has been to use a greater number and variety of security devices to adequately monitor events taking place on the network. However, the use of more security devices to monitor networks creates more data for a monitoring system to handle. More security devices also result in more data for a user to review.

The current approach to monitoring networks with many security devices involves the use of consoles that can receive data from a group of security devices. However, there are many limitations with using existing consoles to monitor a large network. Generally, consoles are inherently limited in that they can only accept data from a few security devices. A further limitation is that users can only review and process data at a relatively slow rate. Finally, because each console on the network only receives information from a limited number of security devices, it is difficult to examine security data on a network-wide basis.

In view of the foregoing, there is a need in the art for a system which will support the collection of relatively large amounts of security event data from a network. Specifically, a need exists to be able to store, filter, and analyze the large amount of security event data so that it can be easily reviewed and managed by users monitoring the network. A further need exists to be able to customize the criteria for filtering the data. There is also a need to be able to collect and format data from a variety of different security devices located on a network. A further need exists to be able to analyze the collected data on a network-wide basis. Finally, there is a need to display the data in a simple graphical format for the users monitoring the network.

SUMMARY OF THE INVENTION

The present invention satisfies the above-described needs by providing a system and method for collecting security event data from security devices located in a distributed computing environment. The present invention improves upon existing approaches by providing a system that can collect, store, filter, and analyze security event data in order to facilitate managing the security for a relatively large computing network. A user can create customized scopes of varying criteria for filtering the data so that only the desired information is provided to a user. Scopes can also be customized to analyze security event data for responding to or anticipating a security event. By storing the security event data, the invention supports the retrieval of additional information about each event if needed. Improving the ability to manage security event data from a network further supports the capacity to respond to a security event when necessary.

In one aspect, the present invention comprises a system for managing security event data collected from a distributed computing network. The invention can include multiple security devices located throughout the network that generate security event data and a database server operable for collecting and storing the security event data. The invention can further comprise software modules operable for filtering and analyzing the security event data to produce resulting data for a client. In response to particular security event data, the client can create an incident report.

In another aspect, the present invention provides a method for managing a large amount of security event data collected from security devices comprising the steps of creating criteria for filtering and analyzing security event data, collecting security event data, and applying the criteria to the collected data to produce a result. The invention can accept and store the results produced from applying the criteria, and provide them to users of the event manager. A database server can also store the collected security event data and the criteria for later use. The results from applying the criteria can be rendered in a variety of different graphical formats including, but not limited to, tables, graphs, charts, and tree diagrams. The invention further supports additional analysis of the results and the creation of an incident report used in responding to the security event. Being able to process a large amount of data describing the security of an entire network enhances the ability to respond to a security event.

For yet another aspect, the present invention further provides a method for rendering selected resulting data from a large amount of security event data in a manageable format. The invention can comprise the steps of creating criteria operable for filtering and analyzing security event data, collecting security event data, applying the filtering and analyzing criteria to the security event data, and rendering the resulting data for a user. The method can support a variety of ways for rendering the analyzed data including, but not limited to, tables, graphs, charts, and tree diagrams. A database server can store the collected data, the criteria used for analyzing the data, and the results of the analysis. This inventive aspect further provides the ability to collect and analyze current security event data which allows for a timely response.

These and other aspects of the invention will be described below in connection with the drawing set and the appended specification and claim set.

BRIEF DESCRIPTION OF THE DRAWINGS

FIG. 16 illustrates an exemplary display screen for sorting events in a table view.

DETAILED DESCRIPTION OF THE EXEMPLARY EMBODIMENTS

Figure 1:
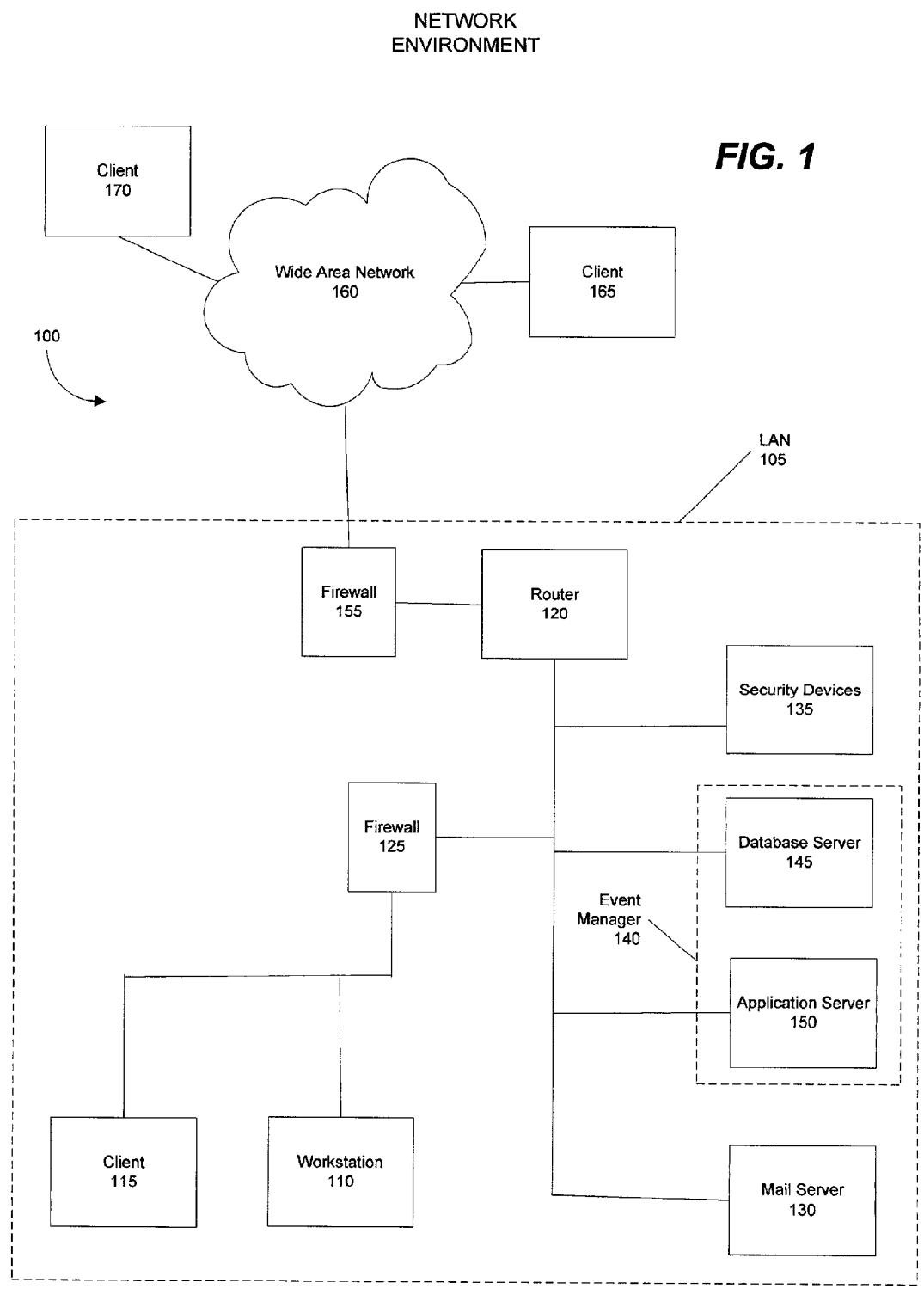
FIG. 1 is a block diagram illustrating an exemplary operating environment for the present invention.

The present invention supports the management of security event data collected from a computing network. Specifically, the present invention allows large amounts of data in varying formats to be collected, stored, filtered, and analyzed according to selected criteria. A user can choose to filter the security event data so that only desired information is analyzed and rendered for monitoring. The ability to filter data provides the users with summaries of only the most important data and allows for greater amounts of information to be collected. If necessary, a user can retrieve more detail about a particular security event from the collected data that is stored. The ability to manage and analyze greater amounts of security event data provides for more effective monitoring of and response to security events.

Although the exemplary embodiments will be generally described in the context of software modules running in a distributed computing environment, those skilled in the art will recognize that the present invention also can be implemented in conjunction with other program modules for other types of computers. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations in a distributed computing environment by conventional computer components, including database servers, application servers, mail servers, routers, security devices, firewalls, clients, workstations, memory storage devices, display devices and input devices. Each of these conventional distributed computing components is accessible via a communications network, such as a wide area network or local area network.

The processes and operations performed by the computer include the manipulation of signals by a client or server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

The present invention also includes a computer program which embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention based on the flow charts and associated description in the application text, for example. Therefore, disclosure of a particular set of program code instructions is not considered necessary for an adequate understanding of how to make and use the invention. The inventive functionality of the claimed computer program will be explained in more detail in the following description in conjunction with the remaining figures illustrating the program flow.

Referring now to the drawings, in which like numerals represent like elements throughout the several figures, aspects of the present invention and the preferred operating environment will be described.

FIG. 1 illustrates various aspects of an exemplary computing environment in which the present invention is designed to operate. Those skilled in the art will appreciate that FIG. 1 and the associated discussion are intended to provide a brief, general description of the computer network resources in a representative distributed computer environment including security devices and the inventive event manager.

Referring to FIG. 1, an exemplary operating environment for the present invention is illustrated. FIG. 1 shows a local area network (LAN) 105 such as that found in a typical company. The LAN 105 can comprise a workstation 110 and a client 115 coupled to the network. A typical LAN 105 can support multiple workstations and clients. The LAN 105 can further comprise a firewall 125 for controlling the flow of electronic data into and out of the network. A router 120 manages the flow of electronic information and data within the network and beyond the network to ensure that packets of electronic data arrive at the correct location. An exemplary LAN 105 can also comprise a mail server 130.

In order to monitor the security of the network, a typical LAN will have numerous security devices located throughout the network. In the exemplary LAN 105 illustrated in FIG. 1, the security devices are represented as a single element 135, but are not limited to this configuration. In other embodiments of the present invention security devices can be located at various points throughout the network or installed or embedded within other systems. An event manager 140, comprising a database server 145 and an application server 150, can also be coupled to the LAN 105. The event manager 140 is operable for collecting security event data from the security devices 135 as described in more detail below in connection with FIG. 2. The local area network 105 can also be coupled to a wide area network 160 such as the World Wide Web. A connection to a wide area network 160 enables remote clients 165 and 170 to access the local area network 105. A typical LAN 105 will also have a firewall 155 between the LAN 105 and the wide area network 160. Although the event manager 140 is described in this representative environment as operating on a LAN, it should be understood that the invention can operate on a variety of distributed computing networks.

Figure 2:
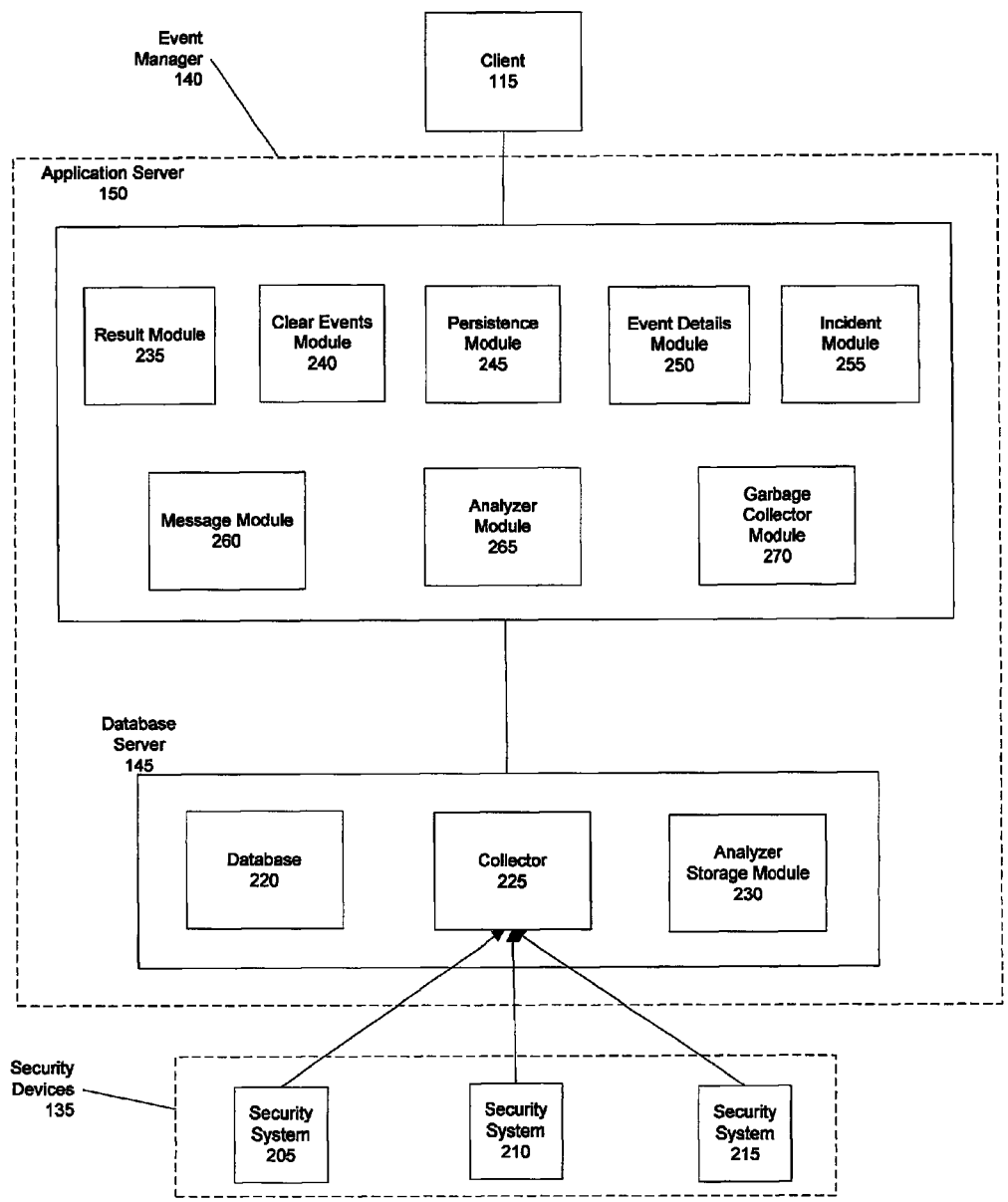
FIG. 2 is a block diagram illustrating an exemplary security event manager system.

Referring to FIG. 2, an exemplary architecture for the event manager 140 is illustrated. The event manager 140 facilitates the management of large amounts of security event data by gathering the data, automatically analyzing the data, and providing the results of any analysis to the users of the event manager 140. As shown in FIG. 1, the event manager 140 comprises the database server 145 and the application server 150. The event manager 140 is coupled to security devices 135 illustrated as discrete security systems 205, 210, and 215. Security event data from the security systems 205, 210, and 215 is gathered by the collector 225 on the database server 145. The database server 145 can further comprise a database 220, operable for storing data, and an analyzer storage module 230, operable for storing procedures for analyzing security event data. The application server 150 is typically coupled to a client 115 and the local area network 105. Although not shown in FIG. 2, a remote client 165 can also access the application server 150. The application server 150 can comprise numerous software modules for managing the security event data collected from the security devices 135. The application server 150 can comprise an analyzer module 265 for analyzing security event data collected by the security devices 135. The application server 150 can also comprise a persistence module 245 for managing the storage of data and a garbage collector module 270 for disposing of unneeded data. The result module 235 provides client 115 with results from the analyzer module 265. The client 115 can also get additional data concerning a security event from the database server 145 through the event details module 250. If a person using client 115 sees an event of significance, an incident can be created with the incident response module 255. A message module 260 supports the collection of messages for a client 115 concerning activities performed on the event manager 140.

Figure 3:
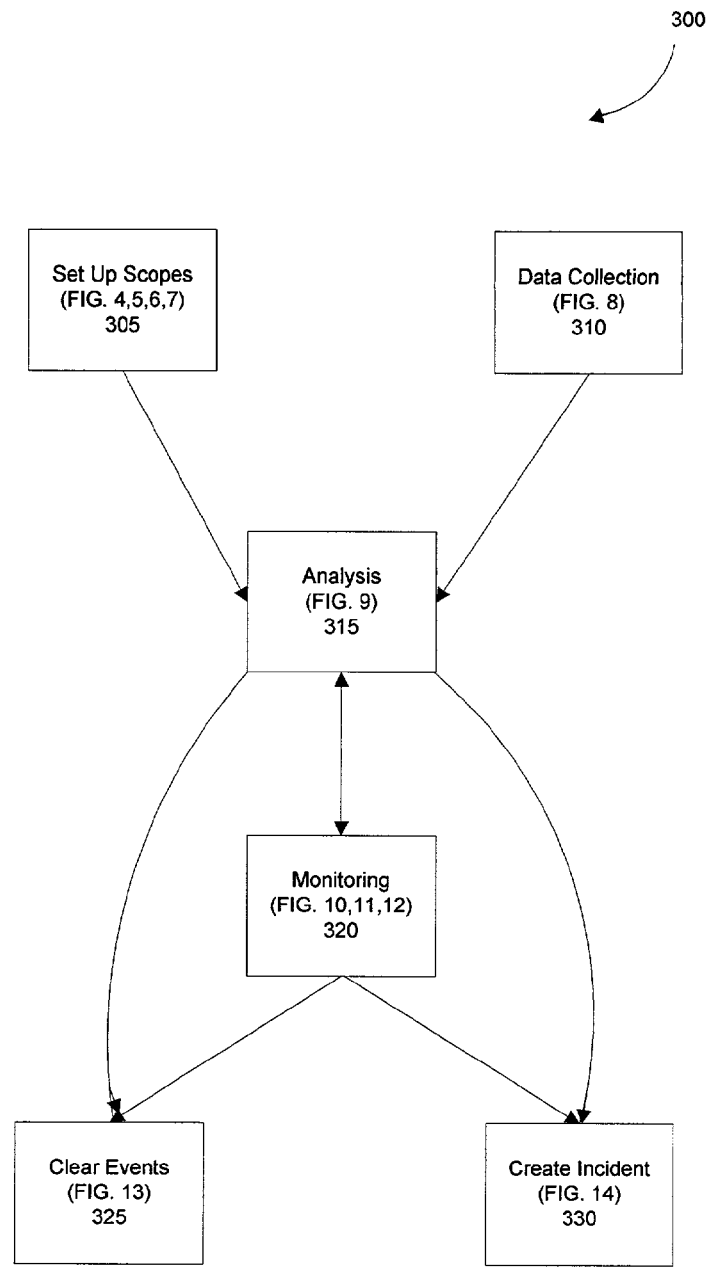
FIG. 3 is a logic flow diagram illustrating an overview of the operating steps performed by an event manager in accordance with an exemplary embodiment of the present invention.

FIG. 3 illustrates an overview of the exemplary processes that the event manager 140 performs. It should be understood that the steps described throughout the invention description can be performed automatically by software modules operating in conjunction with the event manager 140 or by a person operating a client coupled to the event manager 140. Steps 305 and 310 are threshold steps that typically are performed before the event manager 140 performs any analysis. In step 305, either a software module or a person operating client 115 can setup various kinds of scopes for filtering, analyzing, and rendering event data collected by the security devices 135. Different sets of criteria for filtering and analyzing the data can be employed in each scope and the particular scopes can be stored for subsequent use by clients. Throughout the description of the invention, the term "scope" can encompass filtering or analyzing processes, or a combination of the two processes. Furthermore, the term analyzing can include both filtering and analyzing of data. Step 310 illustrates the collection of data from the security devices 135. The collector 225 on database server 145 performs the data collection illustrated in step 310. Step 315 illustrates the analysis performed by the analyzer module 265 on the application server 150. The procedures run by the analyzer module 265 are typically stored on the database server in the analyzer storage module 230. Additionally, preliminary analysis of the data can occur at the security devices 135. Further information concerning preliminary filtering and analysis of data is contained in the non-provisional application entitled, "Method and System for Managing Computer Security Information," filed on Apr. 27, 2001.

In step 320, client 115 can monitor the event data using the selected scopes. The monitoring of data can include further analysis of the data, polling for messages concerning the data, and requesting additional details about particular security events. In step 325, client 115 can clear event data that has previously been stored. For example, event data pertaining to an event that is no longer deemed to be significant can be cleared from storage. In step 330, client 115 can create an incident for a particular event that is deemed to be significant. By creating an incident, the event data is stored by the event manager 140 for future analysis or response. In alternative embodiments of the present invention, the processes performed in steps 325 and 330 can be performed automatically by the event manager 140 or incorporated into the analysis step 315. The ability to automate steps shown in FIG. 3 further supports the management of large amounts of security event data. Additionally, the order of the foregoing steps exemplifies a typical event manager. Alternative embodiments of the present invention may combine certain steps or perform them in a different order.

Figure 4:
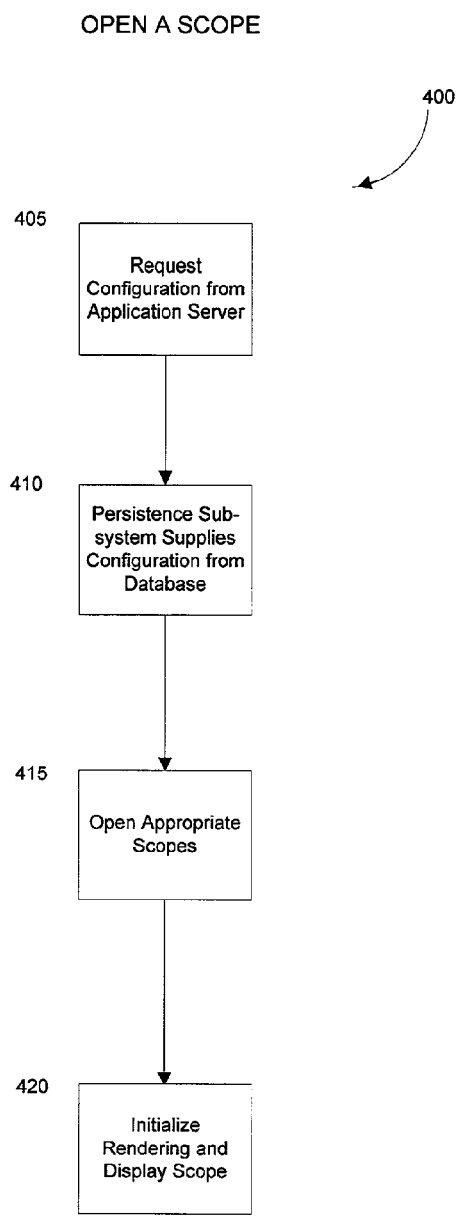
FIG. 4 is a logic flow diagram illustrating an exemplary process for opening a scope within the security event manager.

FIGS. 4, 5, 6, and 7 illustrate exemplary processes for set-up and use of the scopes that filter and analyze security event data. FIG. 4 illustrates an exemplary process for a client to open a scope. In step 405, client 115 requests the configuration for a desired scope from the application server 150. The configuration criteria for the scopes can be stored on the analyzer storage module 230 of database server 145. Typical configuration criteria include sorting security event data by destination address or event type. In step 410, the persistence module 245 retrieves the configuration criteria for the desired scope from the database server 145. In step 415, client 115 opens the desired scope. In step 420, client 115 can initialize and render the display for the scope on an output device, such as a monitor or printer. The display for the scope can comprise one or more tables, charts, graphs, tree diagrams, or other renderings for presenting data to a user.

Figure 5:
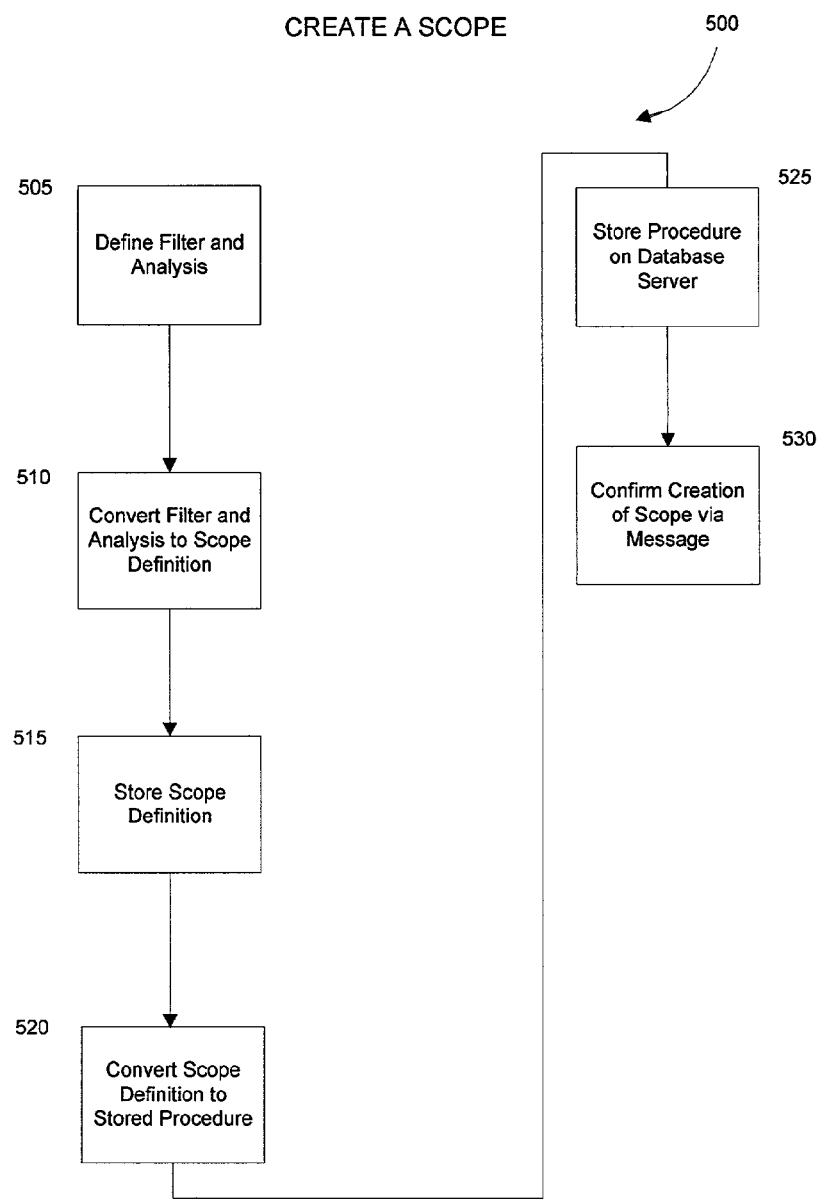
FIG. 5 is a logic flow diagram illustrating an exemplary process for creating a scope within the security event manager.

FIG. 5 illustrates an exemplary process supported by a user to create a new scope for filtering or analyzing data. In step 505, a software module operating within the event manager 140 or a user operating client 115 can define the filter and/or analysis for a new scope. In defining a scope, the user or software module selects certain criteria for filtering and/or analyzing security events, such as a source or destination address, an event type, or the type of sensor. The present invention supports a variety of criteria for filtering and analyzing security event data. In step 510, the analyzer module 265 converts the selected criteria to a scope definition. The scope definition describes what filtering and analysis will be performed on the security event data. In step 515, the persistence module 245 stores the scope definition. The analyzer module 265 then converts the scope definition into a stored procedure in step 520. The stored procedure is a list of instructions that execute when supplied with security event data for the corresponding scope. The persistence module 245 stores the procedure on the database server 145 in step 525. An alternative embodiment can support creating a record of all procedures performed by the event manager 140. Thus, in step 530, when the scope is created, a confirmation message is sent to the client by the analyzer module 265 and/or stored in the message module 260 on the application server 150.

The foregoing steps are merely an exemplary means for presenting the security event data in a graphical and/or text-based format. It should be evident to those skilled in the art that other procedures may be used for rendering the data on an output device. Furthermore, although the creation of a scope is illustrated in step 305 of FIG. 3, a user can create a new scope at any step in FIG. 3.

Figure 6:
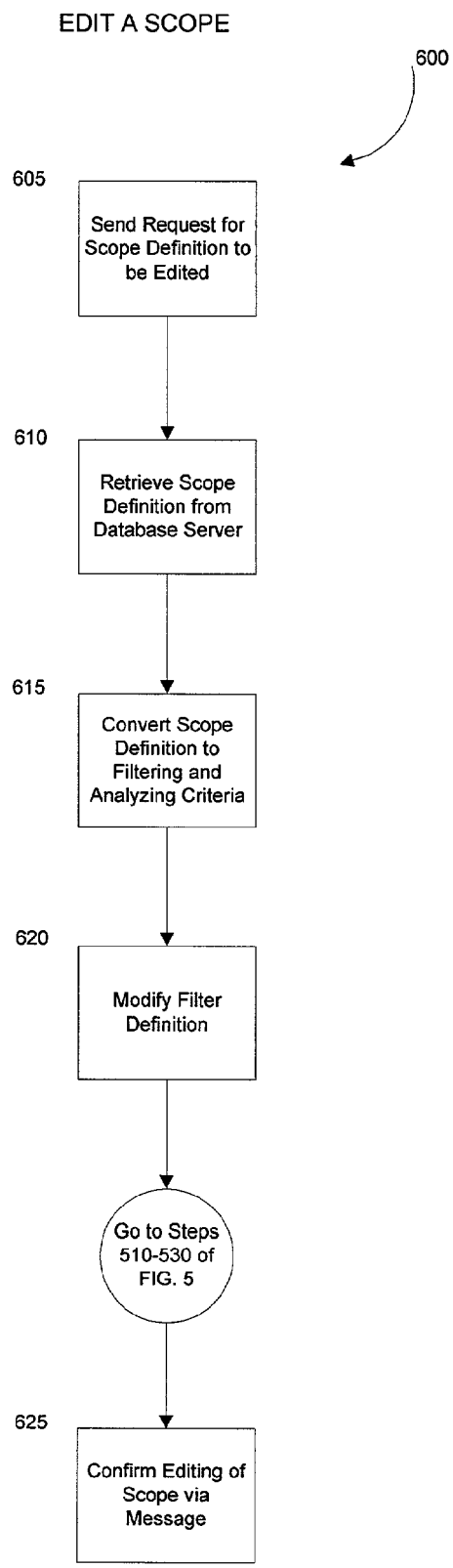
FIG. 6 is a logic flow diagram illustrating an exemplary process for editing a scope within the security event manager.

FIG. 6 illustrates an exemplary process for editing an existing scope. The process illustrated in FIG. 6 can be used to change the filtering or analyzing criteria of a particular scope. In step 605, a software module operating on the event manager 140 or the client 115 can request the scope definition for a particular scope to be edited. In step 610, the persistence module 245 retrieves the stored scope definition from the database server 145. In step 615, the analyzer module 265 converts the scope definition to the originally selected filtering and analyzing criteria. The filtering and analyzing definition is modified by the client 115 in step 620 by deleting and/or adding criteria. The modified scope is then stored by the persistence module 245 in the analyzer storage module 230 according to steps 510 through 530 of FIG. 5. In step 625, the event manager 140 confirms the editing of the scope by sending an electronic message to the message module 260.

Figure 7:
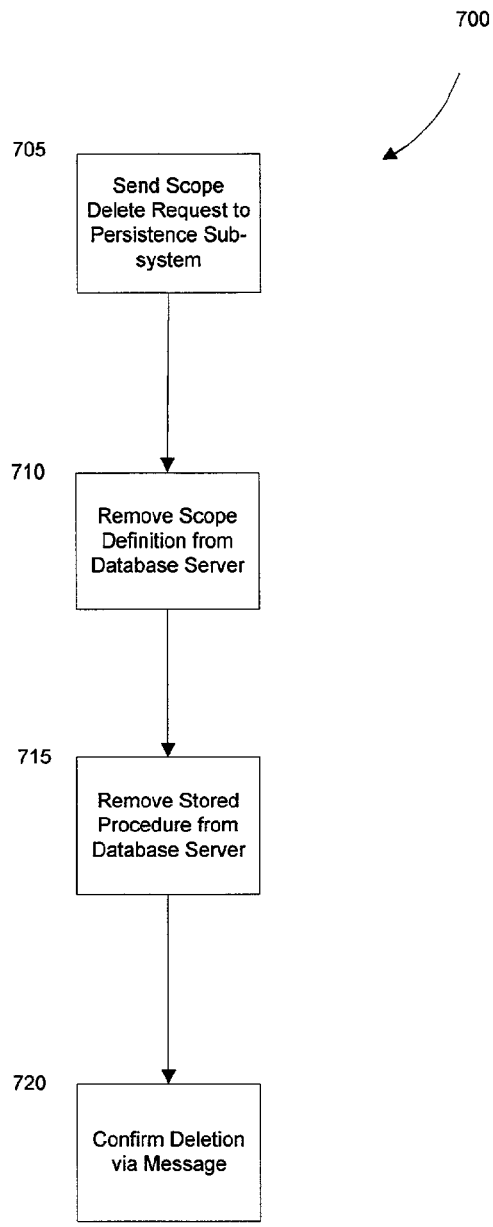
FIG. 7 is a logic flow diagram illustrating an exemplary process for deleting a scope within the security event manager.

Rather than edit a scope, if a user wishes to delete a scope entirely, FIG. 7 illustrates an exemplary process for doing so. The exemplary embodiment provides a user with a particular option for deleting a scope. In step 705, client 115 can send a scope delete request to the persistence module 245. In step 710, the persistence module 245 will remove the scope definition from the database 220 on the database server 145. The stored procedure associated with the criteria for the selected scope is then removed from the database server 145 in step 715. Client 115 will also receive a confirmation message that the scope has been deleted in step 720. The foregoing methods illustrated in FIGS. 4, 5, 6 and 7 demonstrate that embodiments of the present invention can support a variety of filtering and analysis tasks to meet the user's needs.

Figure 8:
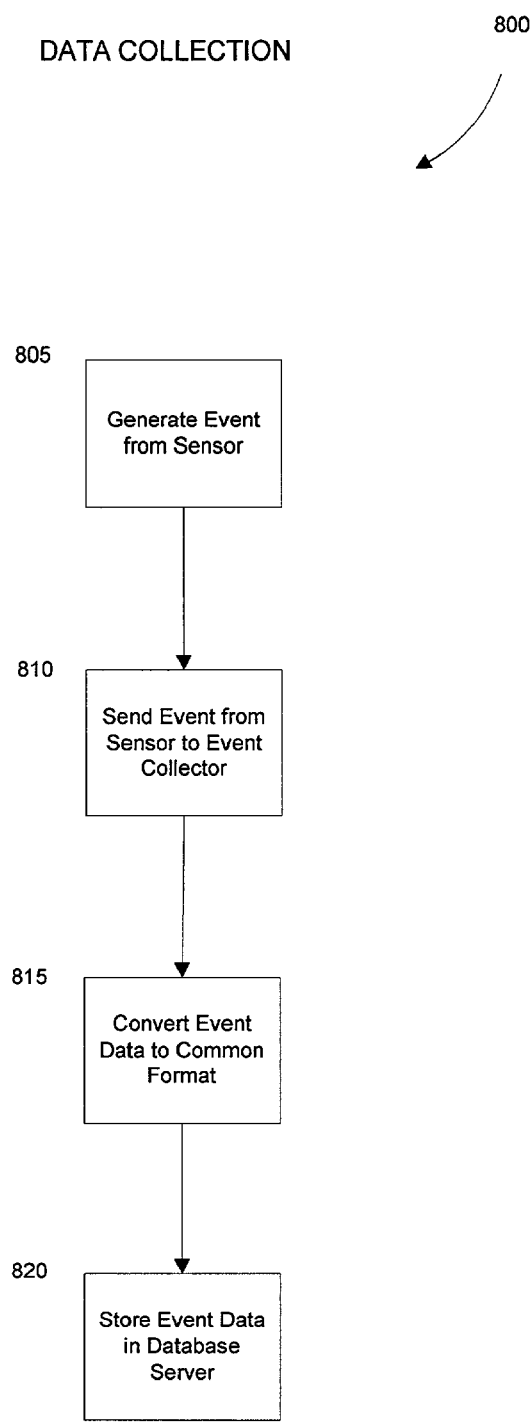
FIG. 8 is a logic flow diagram illustrating an exemplary process for collecting data with the security event manager.

The data collection step 310 of FIG. 3 is illustrated in greater detail in FIG. 8. FIG. 8 illustrates an exemplary process for collecting data from security devices 135. In step 805, a sensor within a security system located on the network generates a security event. The data generated from this security event is sent to the collector 225 in step 810. In an alternative embodiment of the present invention, some filtering or analysis of data may occur at the security system before data is forwarded to the collector 225. Because the collector 225 is gathering data from a variety of different security systems located throughout the network, the collector 225 preferably converts the varied data to a uniform format. In step 815, the collector 225 converts all the gathered event data to a common format. In step 820, the event data, once converted to a common format, is stored in the database 220 for future use or analysis.

Figure 9:
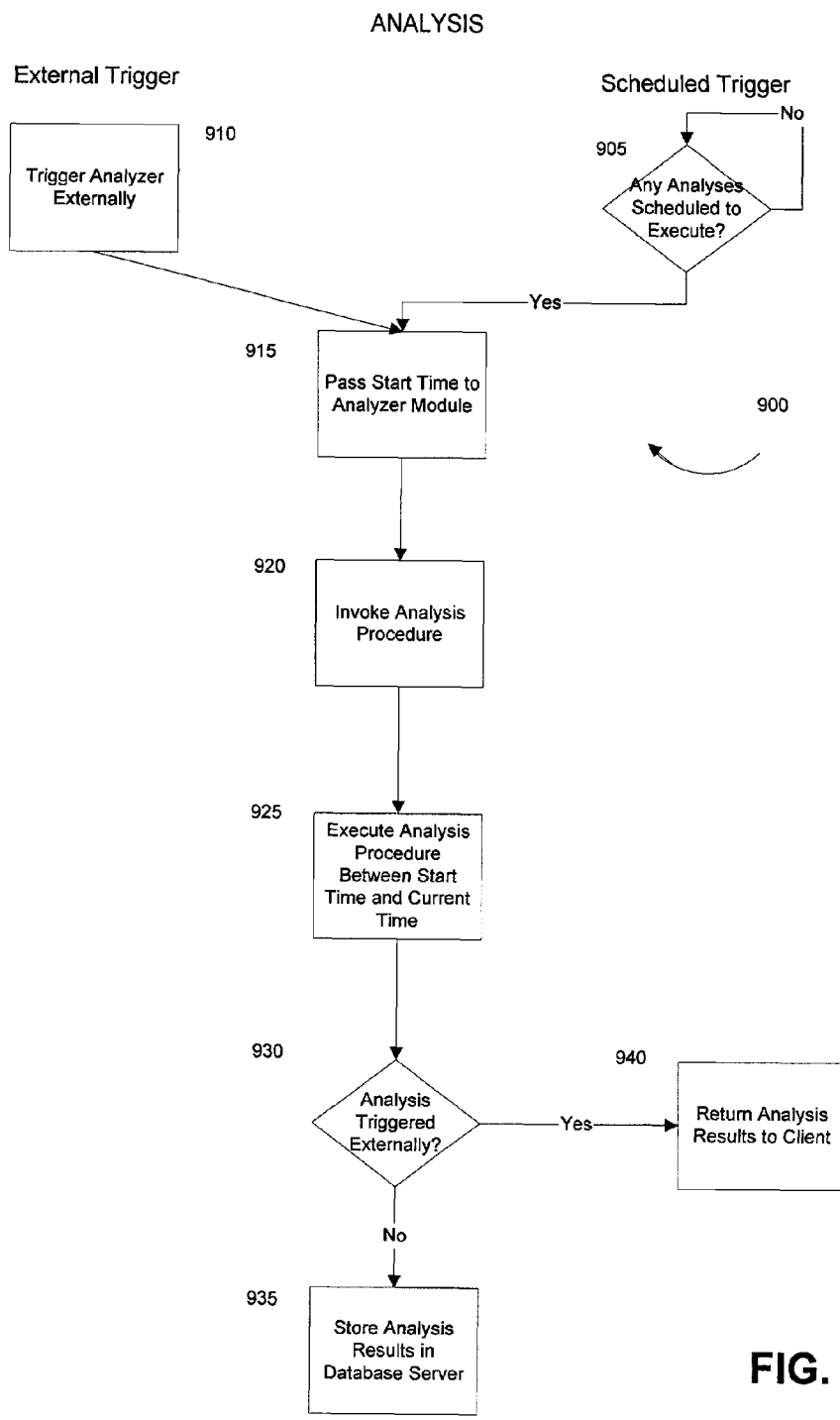
FIG. 9 is a logic flow diagram illustrating an exemplary process for analyzing data with the security event manager.

FIG. 9 illustrates in greater detail the analysis step 315 of FIG. 3 by showing an exemplary process for an event manager 140 to analyze security event data. The analysis of data may be initiated by a scheduled trigger within the event manager as in step 905 or in response to an external request from a user as in step 910. An analysis of data typically occurs over a defined time period. In step 915, client 115 inputs a particular start time or the scheduled start time is sent to the analyzer module 265. The event manager 140 supports a variety of analyses to be performed on the collected security event data These analyses are stored as procedures in the analyzer storage module 230 on the database server 145. For example, an exemplary analysis procedure may compare the source address for security events detected by different security systems located throughout the network. Another exemplary analysis procedure may compare security events and known vulnerabilities for a particular network. The event manager's ability to perform these analyses on a much larger scale of data than traditional approaches supports more effective security monitoring and response to security events.

In step 920, client 115 can invoke a stored analysis procedure. The analysis procedure executes for all event data collected between the start time and the current time in step 925. If the analysis was initiated by a predetermined schedule, the results of the analysis are stored in the database 220 in step 935. If the analysis was performed in response to an external trigger, the "Yes" branch is followed to step 940 where the results of the analysis are presented to client 115. The results of the analysis are typically rendered for the client in a graphical user interface containing tables, charts, graphs, diagrams or other renderings. The three-tier architecture of the present invention enables more rigorous analyses to be performed on larger volumes of security event data than is capable with the traditional console approach. By automatically applying the analysis procedures to large collections of security event data, the event manager 140 allows for more effective network security management. The three-tier architecture also facilitates sharing of information among a plurality of clients being used to conduct security monitoring.

Figure 10:
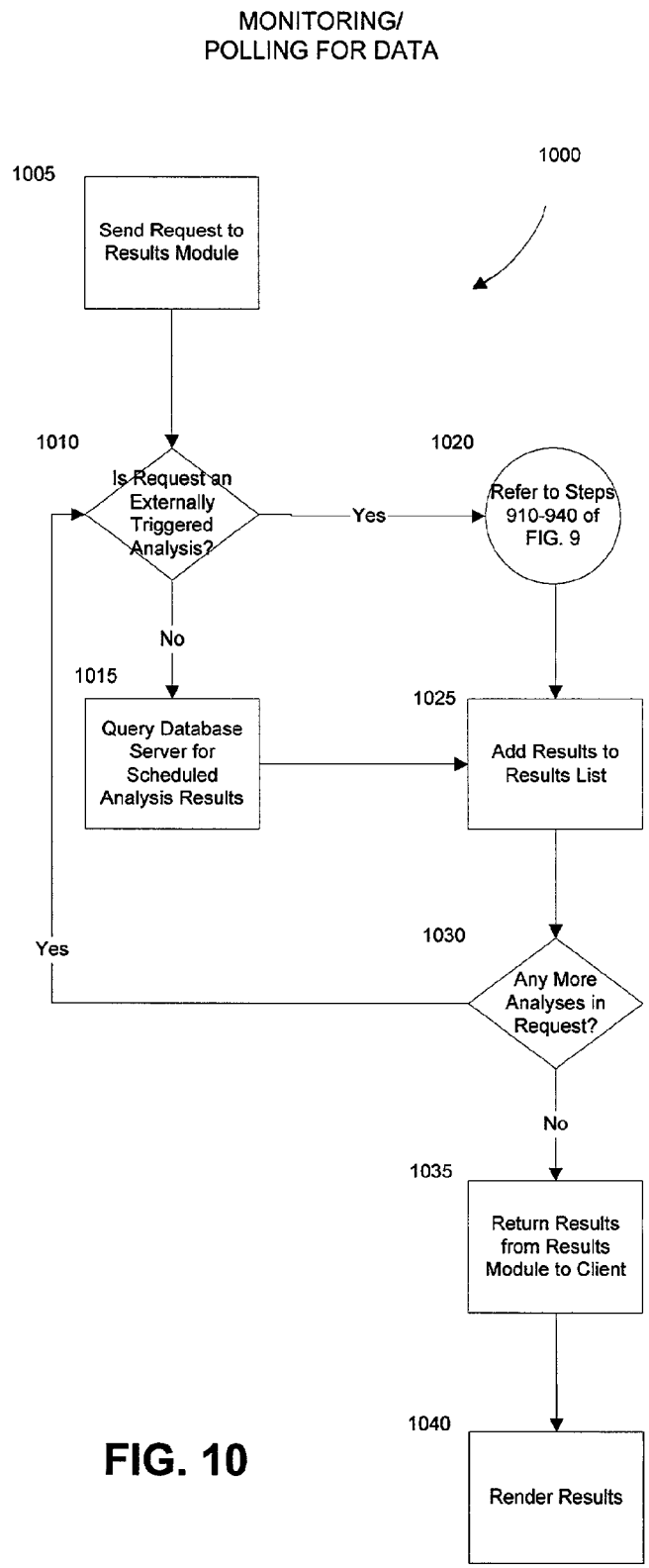
FIG. 10 is a logic flow diagram illustrating an exemplary process for polling for data within the security event manager.
Figure 11:
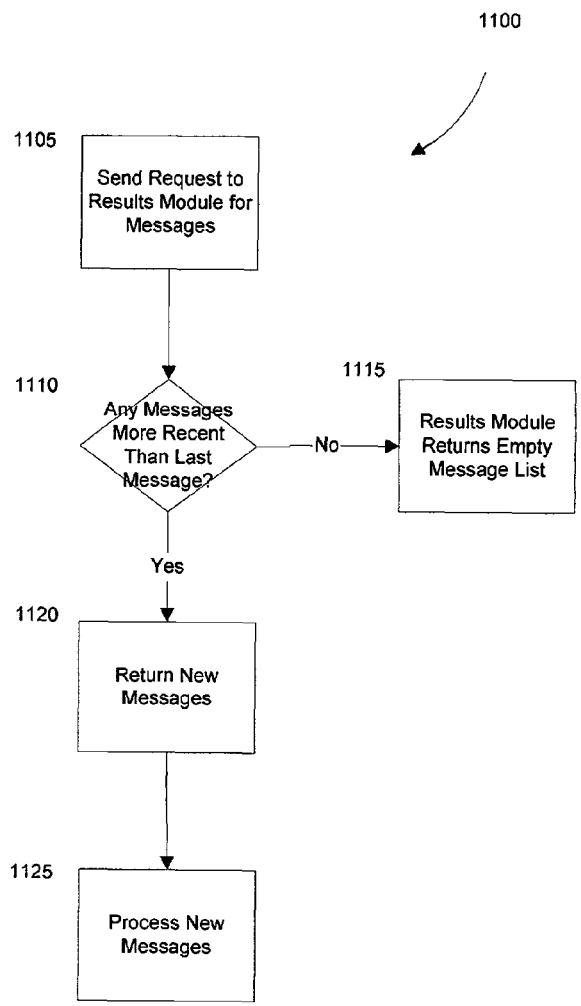
FIG. 11 is a logic flow diagram illustrating an exemplary process for polling for messages within the security event manager.
Figure 12:
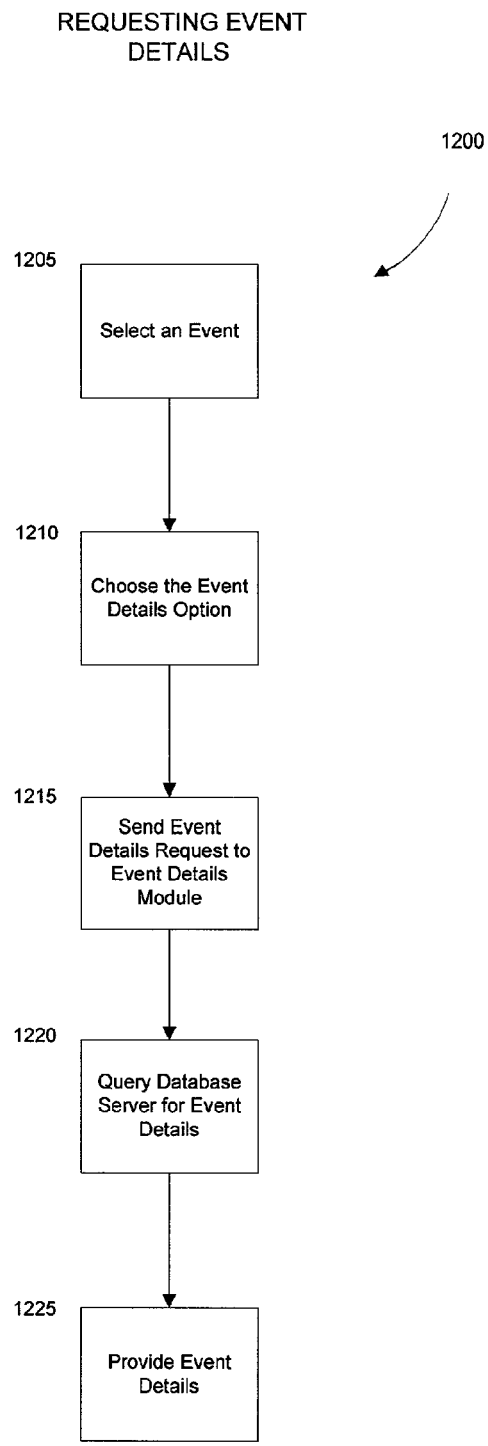
FIG. 12 is a logic flow diagram illustrating an exemplary process for requesting event details from within the security event manager.

FIGS. 10, 11 and 12 illustrate exemplary processes by which users can continue to monitor security event data as it is collected by the event manager 140. FIG. 10 illustrates an exemplary process for polling data. In step 1005, the client 115 sends a request for particular data to the results module 235. In step 1010, if the request corresponds to a scheduled analysis, the "No" branch is followed to step 1015 and the stored results for the analysis are retrieved by the persistence module 245 from the database 220. If the request in step 1010 is externally triggered, the "Yes" branch is followed to step 1020 where steps 910 through 940 from FIG. 9 are performed. In step 1025, the resulting data is added to a running list to be supplied to the client 115. If there are more analyses in the request, the user returns to step 1010 and the foregoing process is repeated. If no more analyses are requested in step

1030, the "No" branch is followed to step 1035 where the results are returned by the results module 235 to the client 115. When the results are returned, the client 115 can choose from a variety of formats for rendering the results in step 1040.

FIG. 11 illustrates an exemplary process whereby a client 115 can poll for electronic messages from the event manager 140. In step 1105, client 115 sends a request for messages to the results module 235. In step 1110, the results module 235 looks to see if there are any new messages for the client. If not, the "No" branch is followed to step 1115 and the client is informed that there are no new messages. If there are new messages, the "Yes" branch is followed to step 1120 where the new messages are returned to the client. In step 1125, client 115 can take the appropriate action based on the message. For example, if there is a message that a needed scope was created, client 115 can then access that scope using the event manager 140.

Referring to FIG. 12, an exemplary process is illustrated for requesting additional event details. Although the discussion and drawings refer to a single event, the invention can support the processing of data corresponding to multiple security events. When a user views a particular scope that is of interest, the user may request additional data concerning a security event. In step 1205, client 115 will select the desired security event. In step 1210, client 115 can choose the event details option provided by the event manager 140. The client's request is sent to the event details module 250 in step 1215. The event details module 250 will query the database 220 for the additional security event data in step 1220. In step 1225, the event details are provided to client 115. The filtering and analysis functions of the event manager 140 are important in that they provide manageable summaries of data to the users of the event manager. However, an equally important feature is the ability of the event manager 140 to retrieve the additional security event data not shown in the summaries.

Figure 13:
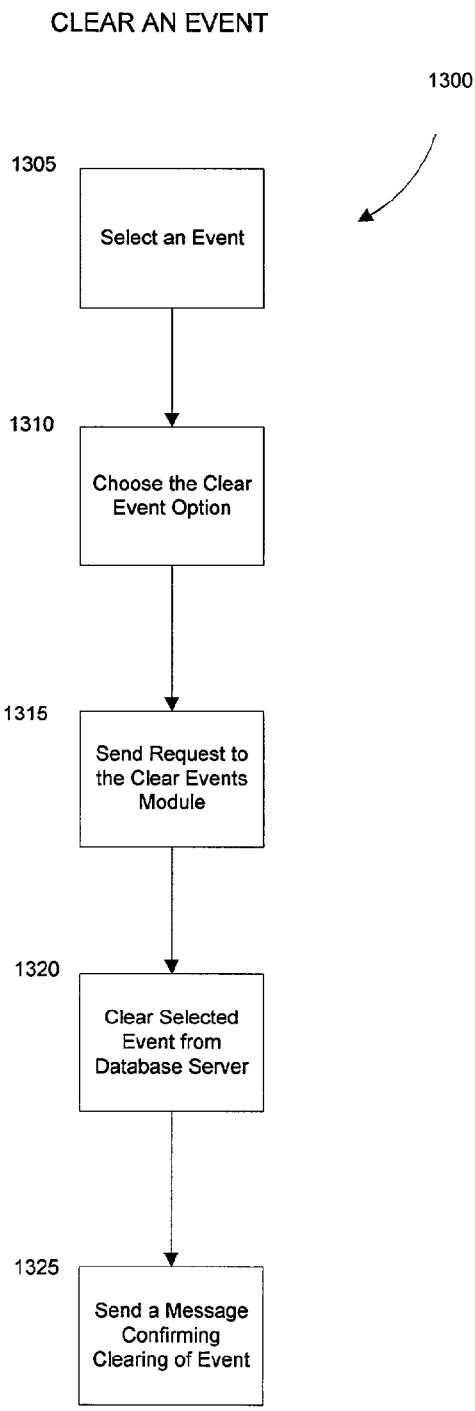
FIG. 13 is a logic flow diagram illustrating an exemplary process for clearing an event from the security event manager.

FIG. 13 illustrates in greater detail the exemplary clear event step 325 of FIG. 3. The process begins in step 1305 when a client 115 selects an event. In step 1310, the client 115 chooses the clear event option. A request is sent to the clear events module 240 in step 1315. The clear events module 240 clears the selected event from the database server 145 in step 1320. In step 1325, a message confirming the clearing of the event is sent to client 115. The clear events function of the event manager 140 aids in the management of data by purging unneeded data.

Figure 14:
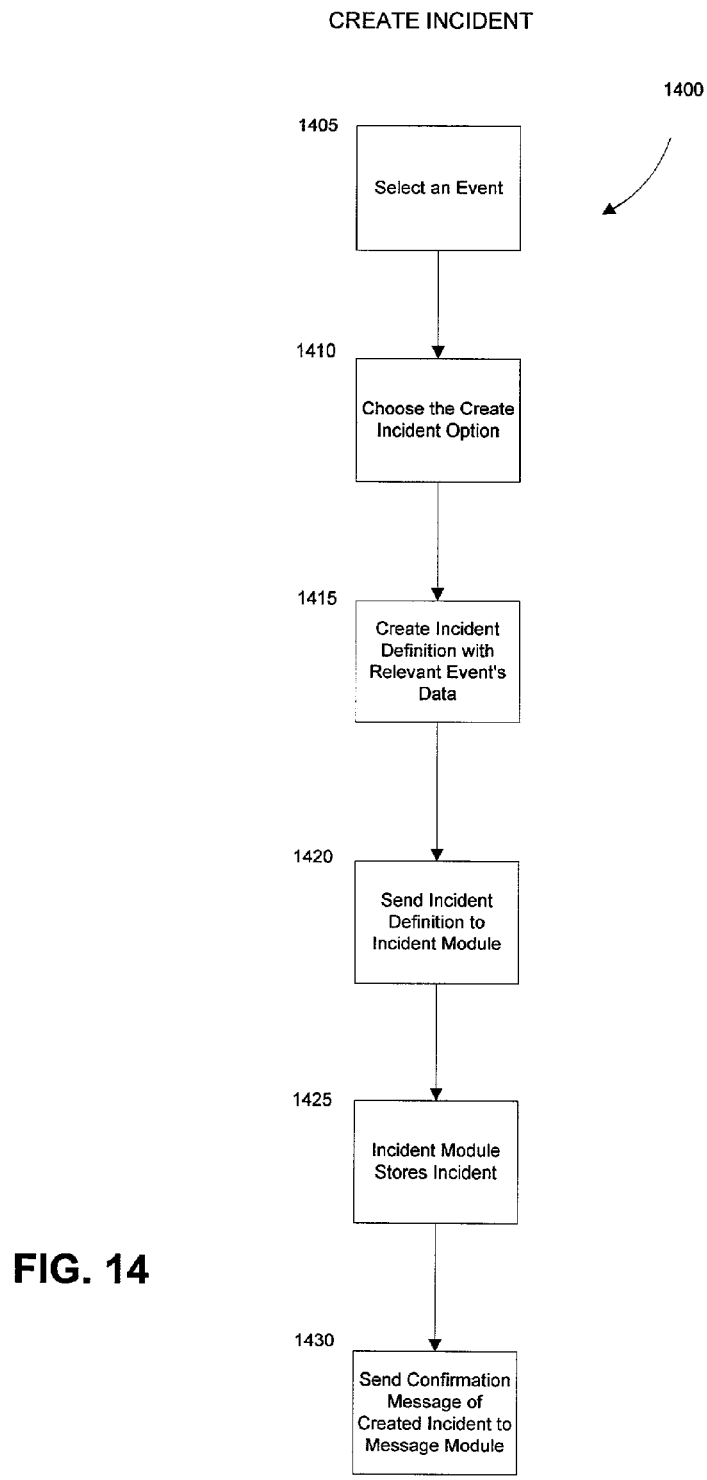
FIG. 14 is a logic flow diagram illustrating an exemplary process for creating an incident within the security event manager.

FIG. 14 illustrates in greater detail the process for creating an incident as referred to in step 330 of FIG. 3. Further information concerning incident records of security events is contained in and fully incorporated herein by reference to the non-provisional application entitled "Method and System for Creating a Record for One or More Computer Security Incidents," filed on Oct. 10, 2000, by the assignee of this application and assigned U.S. application Ser. No. 09/685,285. FIG. 14 illustrates an exemplary process whereby a user can create an incident for security event data that is deemed significant. In step 1405, the client 115 selects event data that is believed to signify an important security event. In step 1410, the client chooses the create incident option provided by the event manager 140. In step 1415, the client creates an incident definition with the relevant event data. The incident definition is then sent to the incident module 255 in step 1420. In step 1425, the incident module 255 stores the incident. The ability to create an incident allows a user to identify particular event data for a response team. After creating the incident, the user can continue to monitor security event data in real time. In step 1430, a confirmation message is sent to the client 115.

Figure 15:
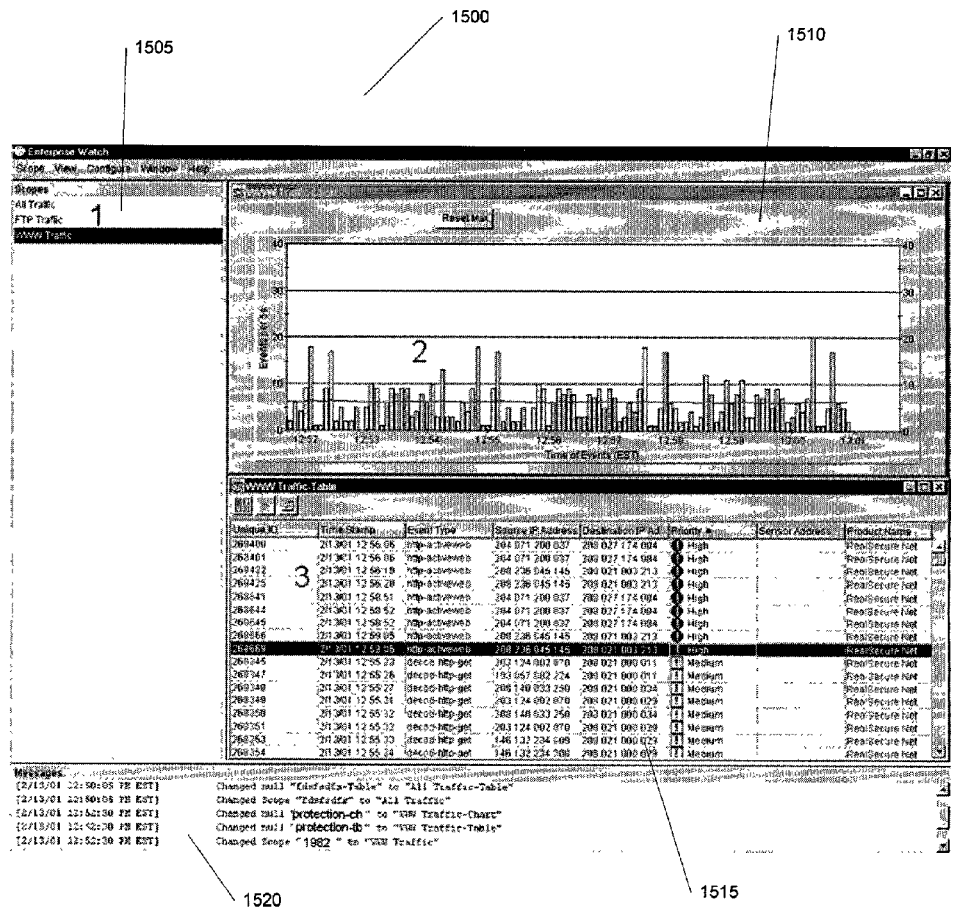
FIG. 15 illustrates an exemplary display screen of a main application window for the event manager.
Figure 16:
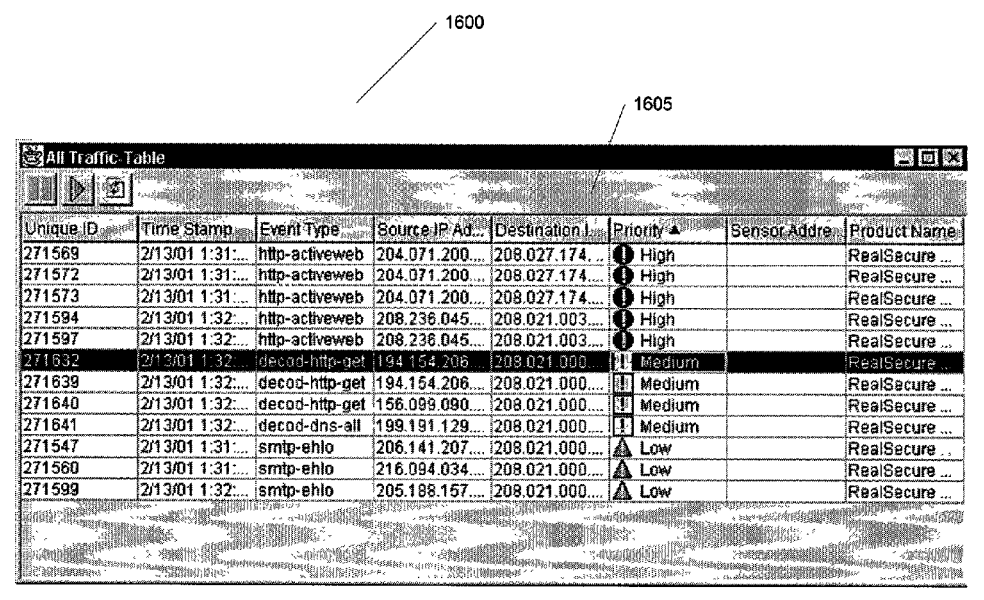
Figure 17:
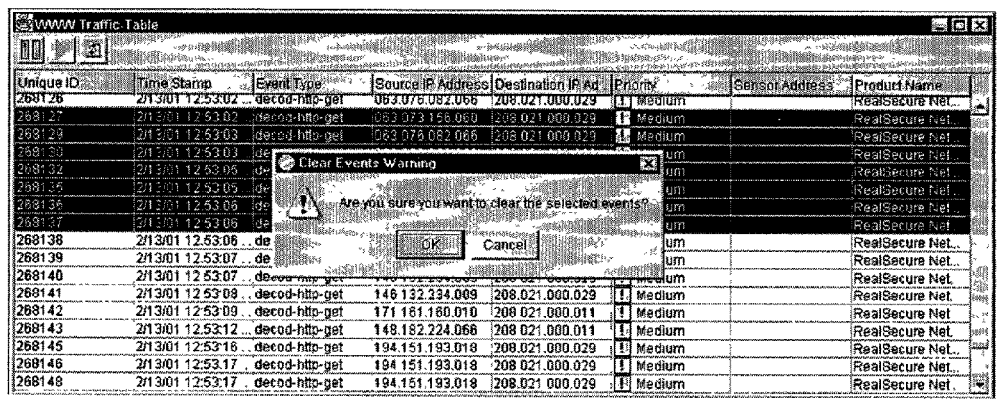
FIG. 17 illustrates an exemplary display screen for clearing security event data from a table.

Referring to FIG. 15, an exemplary screen display is illustrated for the event manager 140. FIG. 15 illustrates an exemplary main application window 1500 employed by a user monitoring a computing network with the event manager 140. The main application window 1500 can comprise various other windows including a message window 1520 showing event manager activities. Window 1505 lists the scopes defined for the computing network being monitored. A user can select one of the scopes listed in window 1505 in order to view filtered security event data in a chart 1510 or table 1515 format. The table 1515 typically indicates when a security event took place, the source and destination addresses of the security event, the event type and priority, and the system that detected the security event. Other types of graphical formats, such as tree diagrams, can also be used to present data. FIGS. 16 and 17 illustrate screen displays 1600 and 1700 of other exemplary tables. The data in the table can be sorted in a variety of ways. FIG. 16 shows event data sorted by priority. FIG. 17 depicts a user clearing security event data.

Figure 18:
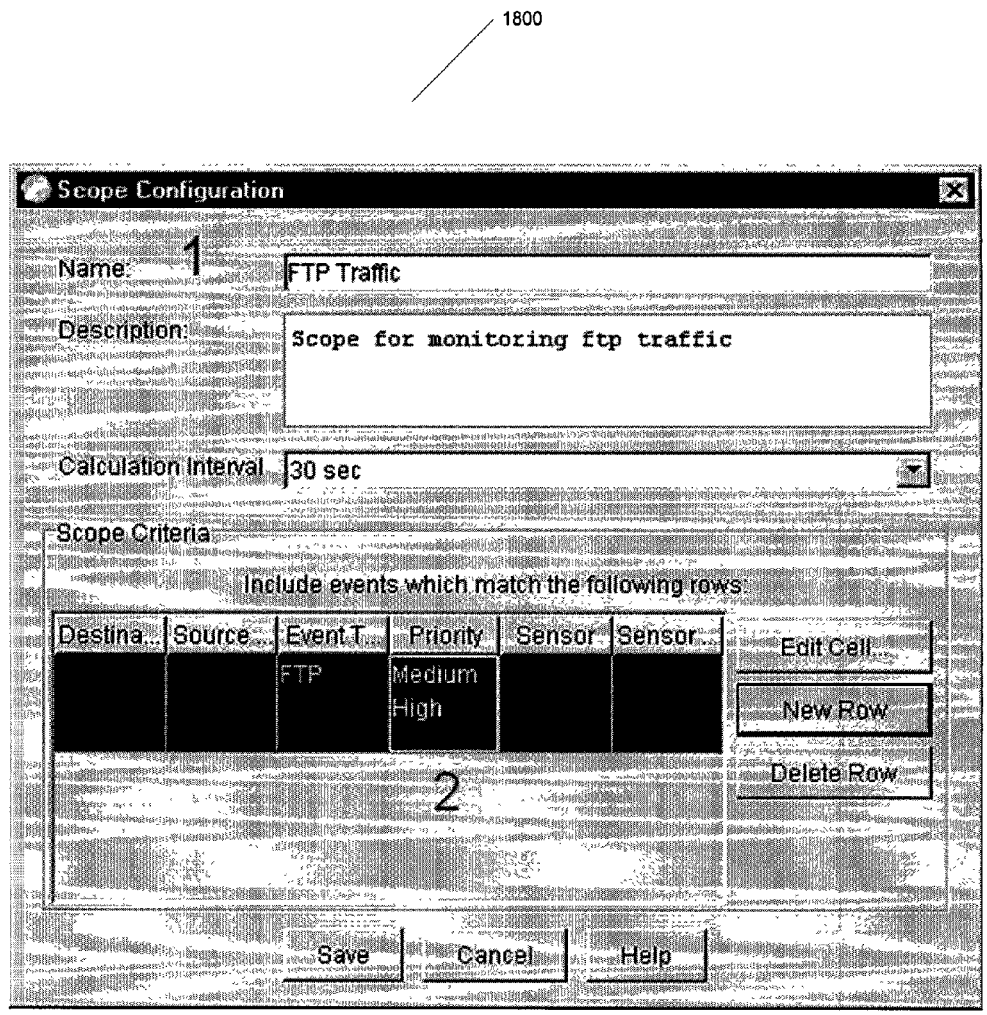
FIG. 18 illustrates an exemplary display screen for configuring a scope.
Figure 19:
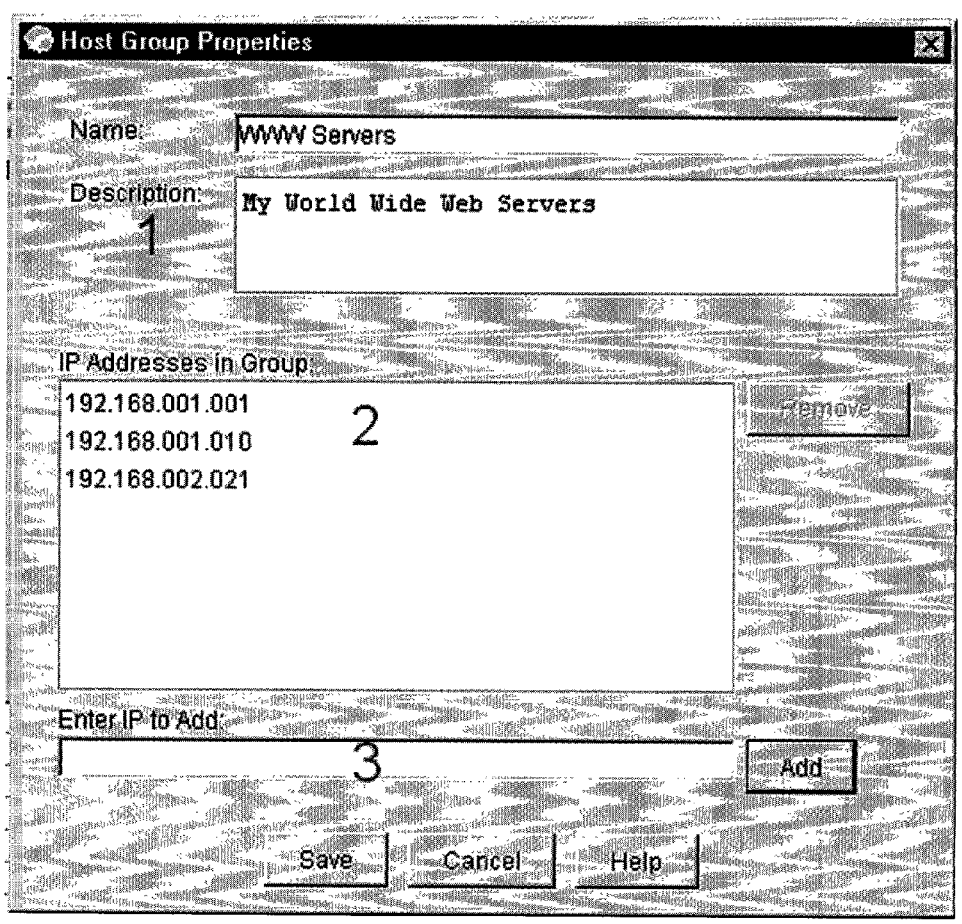
FIG. 19 illustrates an exemplary display screen for configuring a host group.
Figure 20:
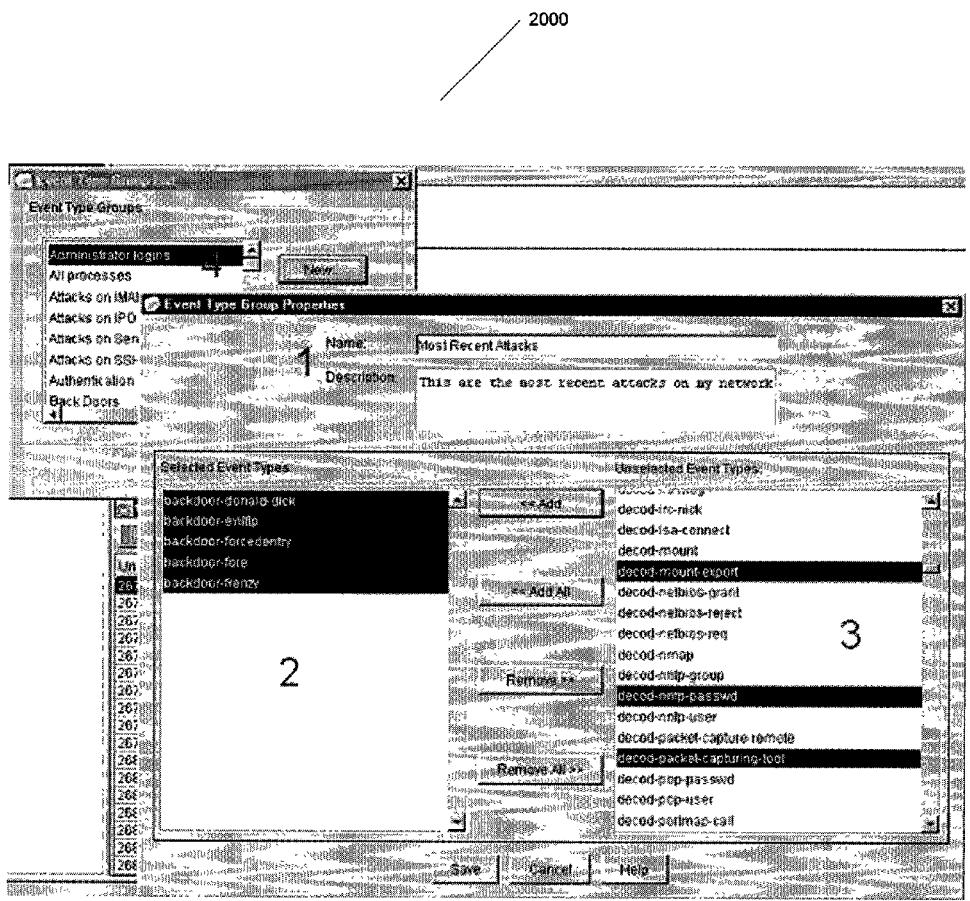
FIG. 20 illustrates an exemplary display screen for configuring a group of event types.

The event manager also facilitates the creation of new scope criteria for the user. FIG. 18 illustrates an exemplary screen display 1800 for configuring a scope. With this display, a user can name the scope, choose an interval for the scope to run, and select the criteria that define the scope. FIGS. 19 and 20 show examples of additional features that assist a user in creating scope criteria. FIG. 19 is an exemplary screen display 1900 showing the host group feature for grouping addresses in a distributed computing environment. Host groups can be used in creating criteria for defining a scope. FIG. 20 illustrates an exemplary screen display 2000 for grouping types of known security events. Filtering data by security event type can be useful way of managing the data.

Figure 21:
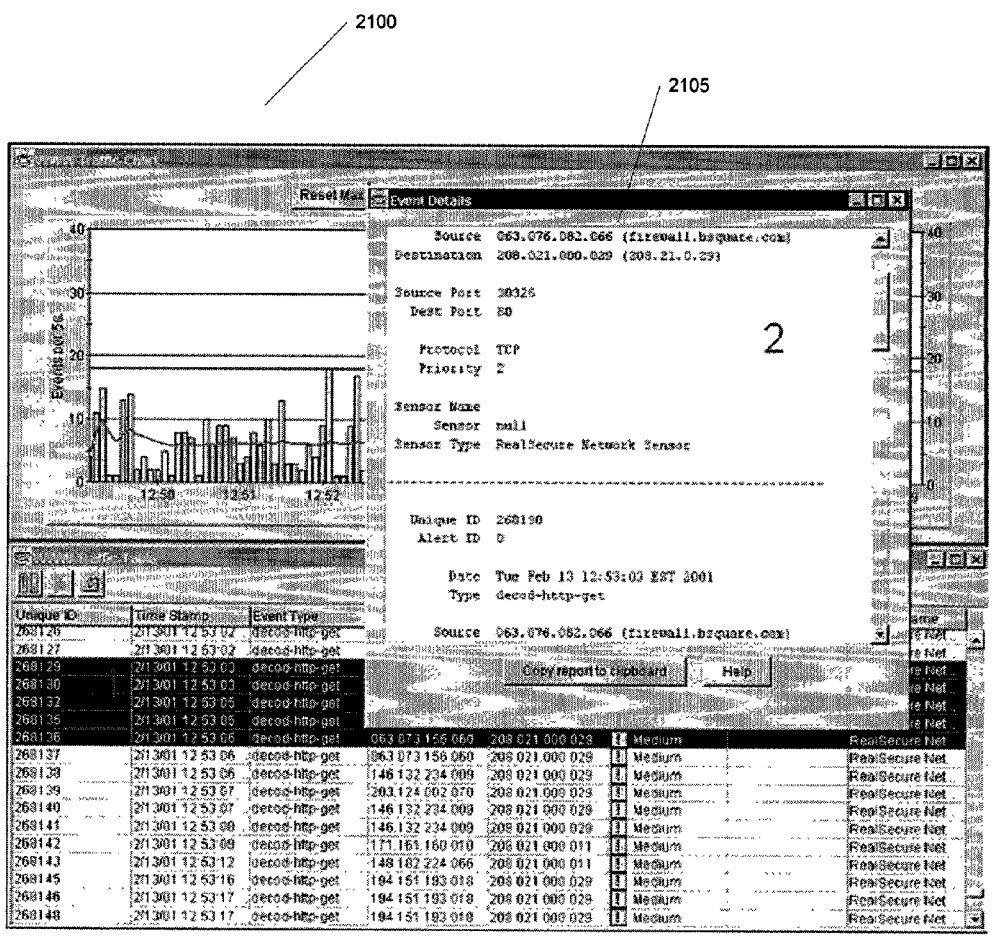
FIG. 21 illustrates an exemplary display screen for security event details.

FIG. 21 illustrates an exemplary screen display 2100 for presenting a user with additional event details. The event details window 2105 can provide additional information such as the source and destination ports for the security event.

Figure 22:
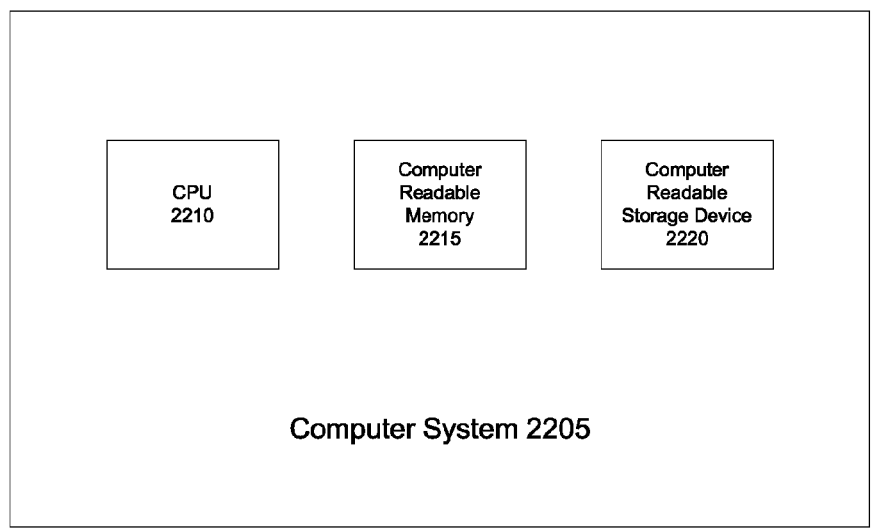
FIG. 22 illustrates a computer system, in accordance with certain exemplary embodiments.

FIG. 22 illustrates aspects of an exemplary computing environment in which an embodiment of the invention is designed to operate. For example, exemplary computing system 2205 can comprise software modules performing the processes described herein, such as the modules 230-270 illustrated in FIG. 2 and described above. The software modules can be stored in exemplary computer-readable storage device 2220 and be executed by exemplary CPU 2210 via exemplary computer-readable memory 2215. Computing system 2205, computer-readable storage device 2220, CPU 2210, and computer-readable memory 2215 are conventional computer components well known to those of ordinary skill in the art. Other embodiments of the invention may operate in other types of computing environments.

In conclusion, the present invention enables and supports the management of large amounts of security event data collected from a computing network. The event manager can gather data from a variety of security devices, place the data in a uniform format, and store the data for later access. The invention allows a user to create criteria for filtering and analyzing the security event data so that manageable summaries of the data are presented to the user. The invention can also present the data to the user in a variety of formats. The ability to manage large amounts of security event data enables a user to more effectively monitor a computing network and respond to any security threats.

It will be appreciated that the present invention fulfills the needs of the prior art described herein and meets the above-stated objects. While there has been shown and described the preferred embodiment of the invention, it will be evident to those skilled in the art that various modifications and changes may be made thereto without departing from the spirit and the scope of the invention as set forth in the appended claims and equivalence thereof. Although the present invention has been described as operating on a local area network, it should be understood that the invention can be applied to other types of distributed computing environments. Furthermore, it should be readily apparent that the components of the event manager can be located in various local and remote locations of a distributed computing environment.

What is claimed is:

1. A method for gathering security event data and rendering result data in a manageable format, the method comprising the steps of:
   a plurality of security devices generating security event data comprising a plurality of alerts in response to detecting a security event in a distributed computing environment, the security devices being logically coupled to a computer having a display;
   the computer presenting a user interface via the display for configuring an event data report that identifies a portion of the security event data;
   the computer receiving a selection via the user interface of one or more user-configurable variables operable for filtering the security event data, the user-configurable variables comprising at least one of a location of a security event, a source of a security event, and a destination address of a security event;
   the computer collecting the security event data generated by the plurality of security devices;
   the computer filtering the collected security event data using the one or more user-configurable variables to produce result data for the event data report, the filtering comprising passing collected security event data that matches the user-configurable variables as result data while blocking collected security event data that does not match the user-configurable variables from the result data;
   the computer transmitting the result data to one or more clients; and
   the one or more clients displaying the event data report comprising the result data.

2. The method of claim 1, wherein collecting the security event data comprises
   a sensor generating security event data;
   the sensor sending the security event data to a collector coupled to the computer; and
   the computer converting the event data to a common format.

3. The method of claim 1, further comprising the computer searching the collected security event data for additional information identifying a security event.

4. The method of claim 1, further comprising the step of the security devices pre-filtering the security event data prior to transmitting the pre-filtered security event data to the computer.

5. The method of claim 1, further comprising the step of performing an analysis on the collected security event data, the analysis comprising at least one of (a) comparing a source address of a first detected security event with a source address of a second detected security event and (b) comparing information associated with each detected security event with information identifying a known vulnerability of the distributed computing environment.

6. The method of claim 1, wherein the user-configurable variables further comprise a network messaging protocol and wherein the computer filtering the collected security event data comprises the computer passing as result data collected security event data resulting from computer network data transmitted using the network messaging protocol while blocking collected security event data resulting from computer network data transmitted using a messaging protocol differing from the network messaging protocol.

7. The method of claim 1, wherein the source of the security event comprises a first division of an organization and the destination address of the security event comprises an address associated with a second division within the organization, and wherein the computer filtering the collected security event data comprises passing as result data collected security event data resulting from computer network traffic originating from a first network node associated with the first division and addressed to a second network associated with the second division.

8. The method of claim 1, wherein the user-configurable variables comprise the source of the security event and the source of the security event comprises a plurality of network addresses and wherein the computer filtering the collected security event data comprises the computer passing as result data the collected security event data originating from a network address that matches one of the plurality of network addresses while blocking collected security event date that does not match any of the plurality of network addresses.

9. A method for managing security event data collected from a plurality of security devices in a distributed computing environment, the method comprising the steps of:
   a plurality of security devices generating security event data in response to detecting a security event in a distributed computing environment, the security event data comprising a plurality of alerts;
   the security devices sending the security event data to a computer coupled to a display;
   the computer presenting a user interface via the display for configuring an event data report that identifies a portion of the security event data;
   the computer receiving a selection via the user interface of one or more user-configurable variables operable for filtering the security event data, the user-configurable variables comprising at least one of a security event type, a priority of a security event, and an identification of a system that detected a security event;
   the computer filtering the security event data using the one or more user-configurable variables to produce result data for the event data report, the filtering comprising passing security event data that matches the user-configurable variables as result data while blocking security event data that does not match the user-configurable variables from the result data; and
   the computer displaying via the display the event data report and the result data comprising filtered alerts based on the user-configurable variables.

10. The method of claim 9, further comprising the step of the security devices pre-filtering the security event data prior to transmitting the pre-filtered security event data to the computer.

11. The method of claim 9, comprising the step of the computer searching the security event data for additional information identifying a security event.

12. The method of claim 9, further comprising the step of performing an analysis on the security event data, the analysis comprising at least one of (a) comparing a source address of a first detected security event with a source address of a second detected security event and (b) comparing information associated with each detected security event with information identifying a known vulnerability of the distributed computing environment.

13. The method of claim 9, further comprising the step of the computer converting the security event data into a common format.

14. The method of claim 9, wherein the user-configurable variables further comprise a network messaging protocol and wherein the computer filtering the security event data comprises the computer passing as result data security event data resulting from computer network data transmitted using the network messaging protocol while blocking security event data resulting from computer network data transmitted using a messaging protocol differing from the network messaging protocol.

15. The method of claim 9, wherein the user-configurable variables comprise a security event priority variable and wherein the computer filtering the security event data comprises the computer passing as result data security event data having a priority that matches the security event priority variable while blocking security event data having priority that does not match the security event priority variable.

16. A computer program product for gathering security event data and rendering result data in a manageable format, the computer program product comprising:
    a computer-readable tangible storage device and computer-readable program code stored thereon, the computer-readable program code comprising:
        computer-readable program code to receive security event data from a plurality of security devices, the security event data comprising a plurality of alerts in response to detecting a security event in a distributed computing environment;
        computer-readable program code to present a user interface via a display for configuring an event data report that identifies a portion of the security event data;
        computer-readable program code to receive a selection via the user interface of one or more user-configurable variables operable for filtering the security event data, the user-configurable variables comprising at least one of a location of a security event, a source of a security event, and a destination address of a security event;
        computer-readable program code to filter the received security event data using the one or more user-configurable variables to produce result data for the event data report, the filtering comprising passing received security event data that matches the user-configurable variables as result data while blocking received security event data that does not match the user-configurable variables from the result data; and
        computer-readable program code to display the event data summary comprising the result data.

17. The computer program product of claim 16, further comprising computer-readable program code to convert the received security event data into a common format.

18. The computer program product of claim 16, further comprising computer-readable program code, stored on the computer-readable tangible storage device, to search the received security event data for additional information identifying a security event.

19. The computer program product of claim 16, wherein the received security event data comprises data pre-filtered by at least one of the plurality of security devices.

20. The computer program product of claim 16, further comprising computer-readable program code, stored on the computer-readable tangible storage device, to perform an analysis on the received security event data, the analysis comprising at least one of (a) comparing a source address of a first detected security event with a source address of a second detected security event and (b) comparing information associated with each detected security event with information identifying a known vulnerability of the distributed computing network.

21. A computer program product for managing security event data collected from a plurality of security devices in a distributed computing environment, the computer program product comprising:
    a computer-readable tangible storage device and computer-readable program code stored thereon, the computer-readable program code comprising:
        computer-readable program code to receive security event data from a plurality of security devices in response to detecting a security event in a distributed computing environment, the security event data comprising a plurality of alerts;
        computer-readable program code to present a user interface via a display for configuring an event data report that identifies a portion of the security event data;
        computer-readable program code to receive a selection via the user interface of one or more user-configurable variables operable for filtering the security event data, the user-configurable variables comprising at least one of a security event type, a priority of a security event, and an identification of a system that detected a security event;
        computer-readable program code to filter the received security event data using the one or more user-configurable variables to produce result data for the event data report, the filtering comprising passing received security event data that matches the user-configurable variables as result data while blocking received security event data that does not match the user-configurable variables from the result data; and
        computer-readable program code to display the event data report and the result data comprising filtered alerts based on the selected variables.

22. The computer program product of claim 21, further comprising computer-readable program code, stored on the computer-readable tangible storage device, to convert the received security event data into a common format.

23. The computer program product of claim 21, further comprising computer-readable program code, stored on the computer-readable tangible storage device, to search the received security event data for additional information identifying a security event.

24. The computer program product of claim 21, wherein the received security event data comprises data pre-filtered by at least one of the plurality of security devices.

25. The computer program product of claim 21, further comprising computer-readable program code, stored on the computer-readable tangible storage device, to perform an analysis on the received security event data, the analysis comprising at least one of (a) comparing a source address of a first detected security event with a source address of a second detected security event and (b) comparing information associated with each detected security event with information identifying a known vulnerability of the distributed computing network.

* * * * *